US010402654B2

(12) United States Patent
Goto et al.

(10) Patent No.: US 10,402,654 B2
(45) Date of Patent: Sep. 3, 2019

(54) IMAGE PROCESSING METHOD FOR SELECTING IMAGE TO BE OUTPUT

(71) Applicant: CANON KABUSHIKI KAISHA, Tokyo (JP)

(72) Inventors: Fumitaka Goto, Tokyo (JP); Hiroyasu Kunieda, Yokohama (JP); Masaaki Obayashi, Kawasaki (JP); Maya Kurokawa, Tokyo (JP); Yoshinori Mizoguchi, Tokyo (JP); Masao Kato, Kawasaki (JP); Tohru Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 30 days.

(21) Appl. No.: 15/382,118

(22) Filed: Dec. 16, 2016

(65) Prior Publication Data

US 2017/0185843 A1 Jun. 29, 2017

(30) Foreign Application Priority Data

Dec. 25, 2015 (JP) .................................. 2015-255236

(51) Int. Cl.
| | |
|---|---|
| *G06K 9/00* | (2006.01) |
| *G06T 7/62* | (2017.01) |
| *G06T 7/73* | (2017.01) |
| *G06T 7/00* | (2017.01) |
| *G06T 7/20* | (2017.01) |

(52) U.S. Cl.
CPC ..... *G06K 9/00718* (2013.01); *G06K 9/00302* (2013.01); *G06T 7/0002* (2013.01); *G06T 7/20* (2013.01); *G06T 7/62* (2017.01); *G06T 7/74* (2017.01); *G06T 2207/10016* (2013.01); *G06T 2207/30242* (2013.01)

(58) Field of Classification Search
CPC .. G06K 9/00718; G06K 9/00302; G06T 7/74; G06T 7/62; G06T 7/002; G06T 7/20; G06T 2207/30242; G06T 2207/10016
See application file for complete search history.

(56) References Cited

U.S. PATENT DOCUMENTS 7,327,891 B2 * 2/2008 Covell .............. G06F 17/30256
382/112
2006/0036948 A1 * 2/2006 Matsuzaka ............. G11B 27/28
715/723

(Continued)

FOREIGN PATENT DOCUMENTS

JP 5686673 B2 3/2015

*Primary Examiner* — John B Strege
(74) *Attorney, Agent, or Firm* — Canon U.S.A., Inc. IP Division

(57) ABSTRACT

An image processing method for selecting an image to be output includes evaluating a plurality of first images having a first attribute and a plurality of second images having a second attribute; performing a plurality of selection processes for selecting a plurality of images to be output from among the plurality of first images and the plurality of second images based on evaluation of the plurality of first images and the plurality of second images obtained in the evaluating; and outputting the selected plurality of images. The plurality of selection processes include a selection process for selecting an image to be output from among the plurality of first images by excluding the plurality of second images from selection candidates.

24 Claims, 18 Drawing Sheets

(56) References Cited

U.S. PATENT DOCUMENTS

| | | | |
|---|---|---|---|
| 2009/0263028 A1* | 10/2009 | Kwon | G06K 9/036 382/224 |
| 2012/0020648 A1* | 1/2012 | Yamaji | G11B 27/034 386/278 |
| 2015/0016727 A1* | 1/2015 | Latin-Stoermer | G06F 17/30256 382/195 |

* cited by examiner

FIG. 5

| IMAGE ID | IMAGE CAPTURING DATE/TIME | FOCUS | NUMBER OF FACES | INDIVIDUAL ID | | | | | | |
|---|---|---|---|---|---|---|---|---|---|---|
| | | | | 1 | | 2 | | 3 | | ... |
| | | | | UPPER LEFT POSITION | LOWER RIGHT POSITION | UPPER LEFT POSITION | LOWER RIGHT POSITION | UPPER LEFT POSITION | LOWER RIGHT POSITION | |
| 1 | 7/1/2015 10h11m12s | ○ | 6 | 40,40 | 65,65 | 90,40 | 115,65 | 10,20 | 25,35 | ... |
| 2 | 7/1/2015 10h12m30s | ○ | 3 | 50,100 | 100,150 | 150,150 | 190,165 | 150,125 | 190,165 | ... |
| 3 | 7/1/2015 10h15m54s | ○ | 0 | - | - | - | - | - | - | ... |
| ... | ... | ... | ... | ... | ... | ... | ... | ... | ... | ... |

501 502 503 504 505
500

| SCENE | IMAGE CAPTURING PERIOD (TIME) | | NUMBER OF CAPTURED IMAGES (IMAGES) | | NUMBER OF SUBJECTS (PEOPLE) | |
|---|---|---|---|---|---|---|
| | AVERAGE | STANDARD DEVIATION | AVERAGE | STANDARD DEVIATION | AVERAGE | STANDARD DEVIATION |
| TRAVEL | 33.221 | 4.778 | 324.857 | 393.691 | 1.506 | 0.256 |
| DAILY LIFE | 3.336 | 4.671 | 54.892 | 108.805 | 1.465 | 0.974 |
| CEREMONY | 4.634 | 1.532 | 165.457 | 71.055 | 2.547 | 0.527 |

FIG. 8A

| SCENE | CHARACTERISTICS OF MAIN-SLOT IMAGE | CHARACTERISTICS OF SUB-SLOT IMAGE |
|---|---|---|
| TRAVEL | WIDE-VIEW IMAGE OF PEOPLE AND SCENERY | CLOSE-UP IMAGE OR IMAGE OF PROFILE |
| DAILY LIFE | CLOSE-UP IMAGE OR IMAGE OF PROFILE | WIDE-VIEW IMAGE OF PEOPLE AND SCENERY |
| CEREMONY | IMAGE OF TWO PEOPLE CLOSE TO EACH OTHER | IMAGE OF MANY PEOPLE |

FIG. 8B

| IMAGE ID | SCORE (MAXIMUM OF 50 POINTS) | |
|---|---|---|
| | MAIN SLOT (POINTS) | SUB SLOT (POINTS) |
| 1 | 20 | 40 |
| 2 | 45 | 10 |
| 3 | 10 | 20 |
| ... | ... | ... |

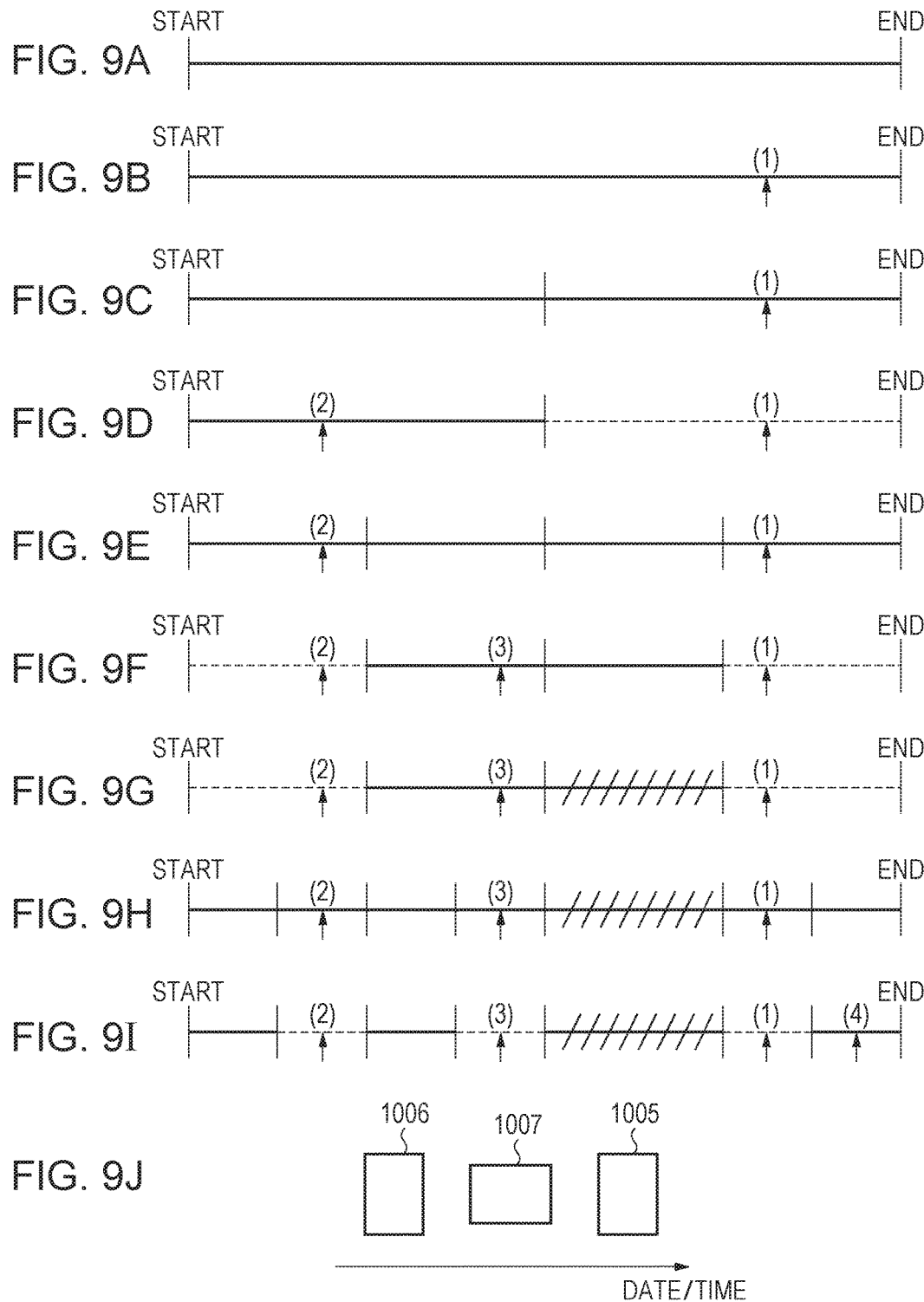

FIG. 10A1
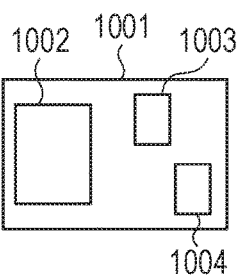
1002, 1001, 1003, 1004
FIG. 10B1
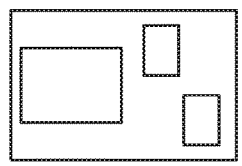
FIG. 10C1
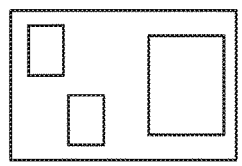
FIG. 10D1
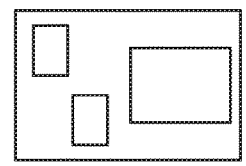
FIG. 10A2
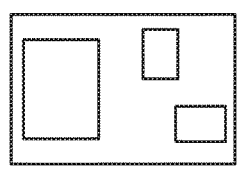
FIG. 10B2
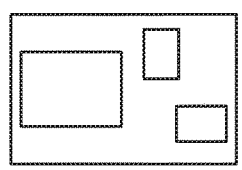
FIG. 10C2
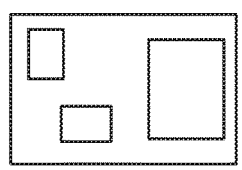
FIG. 10D2
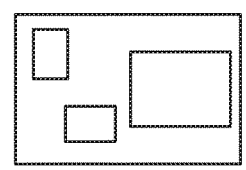
FIG. 10A3
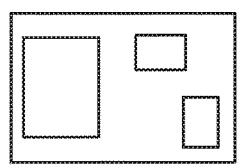
FIG. 10B3
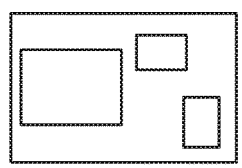
FIG. 10C3
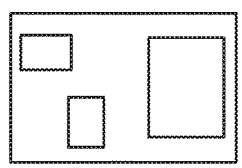
FIG. 10D3
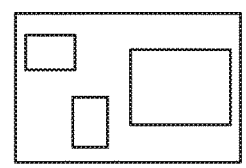
FIG. 10A4
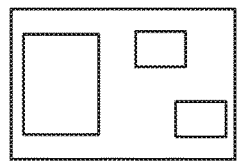
FIG. 10B4
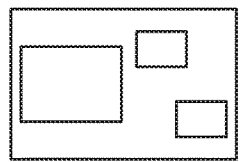
FIG. 10C4
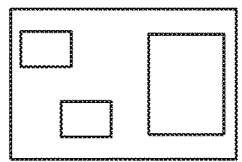
FIG. 10D4
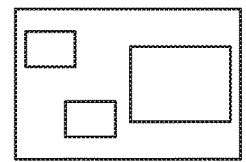

FIG. 16A

| IMAGE ID | SCORE BASED ON EACH CRITERION ||||| SCORE | CORRECTED SCORE | RANKING | CORRECTED RANKING | RATING-BASED SCORE | DYNAMIC-MOVEMENT SCORE |
| --- | --- | --- | --- | --- | --- | --- | --- | --- | --- | --- | --- |
| | FACE COUNT | FACE POSITION | FACE SIZE | FOCUS | NUMBER OF PIXELS | | | | | | |
| local_high_static_1 | 35 | 35 | 45 | 40 | 50 | 41.0 | 41.0 | 2 | 2 | 0 | 0 |
| local_high_static_4 | 30 | 35 | 40 | 40 | 50 | 39.0 | 39.0 | 3 | 3 | 0 | 0 |
| local_high_static_7 | 45 | 45 | 45 | 50 | 50 | 47.0 | 47.0 | 1 | 1 | 0 | 0 |
| local_high_dynamic_2 | 30 | 20 | 20 | 30 | 25 | 25.0 | 27.5 | 6 | 6 | 0 | 5 |
| local_high_dynamic_5 | 30 | 25 | 30 | 40 | 25 | 30.0 | 33.0 | 4 | 4 | 0 | 15 |
| local_high_dynamic_8 | 30 | 20 | 40 | 30 | 25 | 29.0 | 31.9 | 5 | 5 | 0 | 30 |

FIG. 16B

| IMAGE ID | SCORE BASED ON EACH CRITERION ||||| SCORE | CORRECTED SCORE | RANKING | CORRECTED RANKING | RATING-BASED SCORE | DYNAMIC-MOVEMENT SCORE |
| --- | --- | --- | --- | --- | --- | --- | --- | --- | --- | --- | --- |
| | FACE COUNT | FACE POSITION | FACE SIZE | FOCUS | NUMBER OF PIXELS | | | | | | |
| local_high_static_1 | 35 | 35 | 45 | 40 | 50 | 41.0 | 41.0 | 2 | 2 | 0 | 0 |
| local_high_static_4 | 30 | 35 | 40 | 40 | 50 | 39.0 | 39.0 | 3 | 3 | 0 | 0 |
| local_high_static_7 | 45 | 45 | 45 | 50 | 50 | 47.0 | 47.0 | 1 | 1 | 0 | 0 |
| server_low_static_3 | 35 | 30 | 45 | 25 | 25 | 32.0 | 36.8 | 5 | 5 | 20 | 0 |
| server_low_static_6 | 40 | 30 | 40 | 30 | 25 | 33.0 | 38.0 | 4 | 4 | 15 | 0 |
| server_low_static_9 | 20 | 40 | 45 | 25 | 25 | 31.0 | 35.7 | 6 | 6 | 40 | 0 |

IMAGE PROCESSING METHOD FOR SELECTING IMAGE TO BE OUTPUT

BACKGROUND OF THE INVENTION

Field of the Invention

The aspect of the embodiments relates to a technique for selecting one or more images from among a plurality of images.

Description of the Related Art

As it has become common to use digital cameras and smartphones to capture still images and moving images, an enormous number of still images and moving images are captured and stored by a user. Selecting images (frame images in the case of moving images) from among such an enormous number of still images and moving images to create an album is a laborious task for a user.

To cope with such circumstances, three methods for automatically selecting and arranging images from an image group including still images and moving images have been proposed in Japanese Patent No. 5686673. The first method is a method for extracting a predetermined number of frame images from each moving image in accordance with a table, which defines the number of images to be extracted in accordance with duration of the moving image, for example. The second method is a method for extracting a frame image from a moving image if a result of analysis of moving images indicates that an amount of change between the frame images has reached a fixed value, for example, the direction in which the face is oriented has changed by 15 degrees or more. The third method is a method for extracting recommended frame images within a range not exceeding the number of images (reference number) that can be arranged on a page if the sum of the number of still images and the number of extracted frames exceeds the reference number. Japanese Patent No. 5686673 also discloses another method for extracting recommended images from each group including still images and moving images.

However, the first and second methods have an issue in that even if frame images have poor quality, for example, if all frame images of a moving image are out of focus, such frame images having poor quality are arranged. In addition, the third method has an issue in that if moving images include the reference number of recommended frame images or more, all of the reference number of images are frame images and no non-frame images are possibly arranged. In addition, in the case where recommended images are extracted in accordance with the other method disclosed in Japanese Patent No. 5686673, no images extracted from moving images are arranged if the reference number of recommended images ranked high include no image extracted from moving images and all the recommended images are still images.

SUMMARY OF THE INVENTION

An image processing method according to an aspect of the embodiments is an image processing method for selecting an image to be output, including evaluating a plurality of first images having a first attribute and a plurality of second images having a second attribute; performing a plurality of selection processes for selecting a plurality of images to be output from among the plurality of first images and the plurality of second images based on evaluation of the plurality of first images and the plurality of second images obtained in the evaluating; and outputting the selected plurality of images. The plurality of selection processes include a selection process for selecting an image to be output from among the plurality of first images by excluding the plurality of second images from selection candidates.

Further features of the disclosure will become apparent from the following description of exemplary embodiments with reference to the attached drawings.

BRIEF DESCRIPTION OF THE DRAWINGS

FIG. 5 is a diagram illustrating image analysis information.

FIGS. 8A and 8B are diagrams each illustrating the concept of score computation criteria.

FIGS. 9A to 9J are diagrams for describing image data selection.

FIGS. 10A1 to 10D4 are diagrams illustrating a template group to be used for arrangement of image data.

FIGS. 16A and 16B are diagrams each illustrating an example of scores and rankings of images.

DESCRIPTION OF THE EMBODIMENTS

In this embodiment, a procedure starting from running of an album creation application (app) on an image processing apparatus to automatically creating of a layout will be described. In the following description, the term "image" encompasses still images, moving images, and frame images in moving images unless otherwise noted. In addition, the term "image" also encompasses still images, moving images, and frame images in moving images that can be obtained via a network from a network service such as SNS or from network storage.

Figure 1:
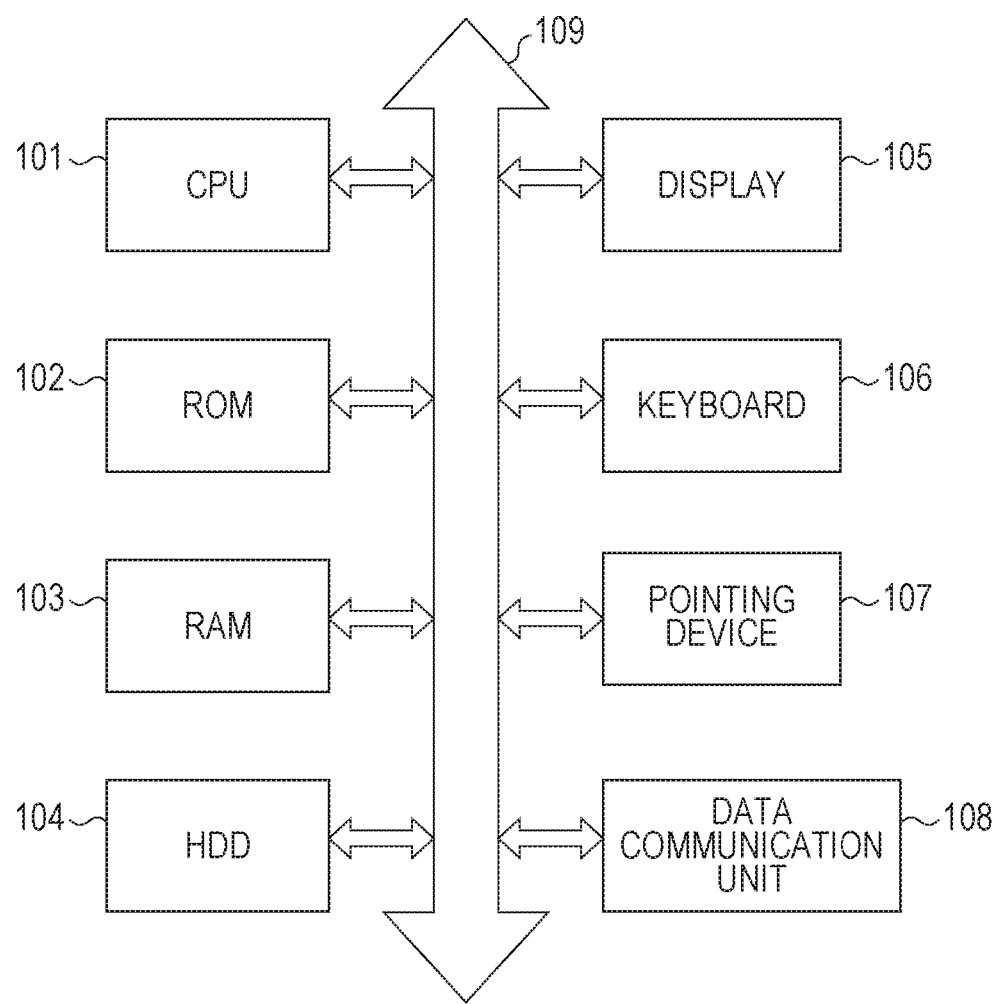
FIG. 1 is a block diagram illustrating a hardware configuration of an image processing apparatus.

FIG. 1 is a block diagram illustrating a hardware configuration of an image processing apparatus 100. The image processing apparatus 100 may be, for example, a personal computer (PC) or a smartphone. It is assumed in this embodiment that the information processing apparatus 100 is a PC. The information processing apparatus 100 includes a central processing unit (processor) 101, a read-only memory (ROM) 102, a random access memory (RAM) 103, a hard disk drive (HDD) 104, a display 105, a keyboard 106, a pointing device 107, a data communication unit 108, and a data bus 109. The CPU 101 integrally controls the image processing apparatus 100. The CPU 101 reads a program stored on the ROM 102 into the RAM 103 and executes the program, thereby realizing operations of the present embodiment. FIG. 1 illustrates one CPU 101; however, the image processing apparatus 100 may include a plurality of CPUs 101. The ROM 102 is a general-purpose ROM and stores a program executed by the CPU 101, for example. The RAM 103 is a general-purpose RAM and is used as a working memory for temporarily storing various kinds of information when the CPU 101 executes the program, for example. The HDD 104 is a storage medium (storage unit) that stores still image files, moving image files, databases for holding results of processing such as image analysis, and templates used by an album creation application, for example.

The display 105 displays a user interface (UI) and an image arrangement result according to the present embodiment. Each of the keyboard 106 and the pointing device 107 accepts an instruction operation from a user. The display 105 may have a touch sensor function. The keyboard 106 is used, for example, when the user inputs a number of double-page spreads of an album to be created in the UI displayed on the display 105. The pointing device 107 is a coordinate specifying device and is used, for example, when the user clicks a button in the UI displayed on the display 105.

The data communication unit 108 communicates with an external apparatus that is connected via a wired or wireless network or directly to the image processing apparatus 100. The data communication unit 108 transmits, for example, data of a layout created by an automatic arrangement function to a printer or server capable of communicating with the image processing apparatus 100. The data communication unit 108 is also capable of receiving still images and moving images from network storage capable of communicating with the image processing apparatus 100, such as a server or SNS. The data bus 109 connects the CPU 101 to the ROM 102, the RAM 103, the HDD 104, the display 105, the keyboard 106, the pointing device 107, and the data communication unit 108.

The HDD 104 stores the album creation application according to the present embodiment. The album creation application starts in response to the user double-clicking an application icon displayed on the display 105 by using the pointing device 107 as described later.

Figure 2:
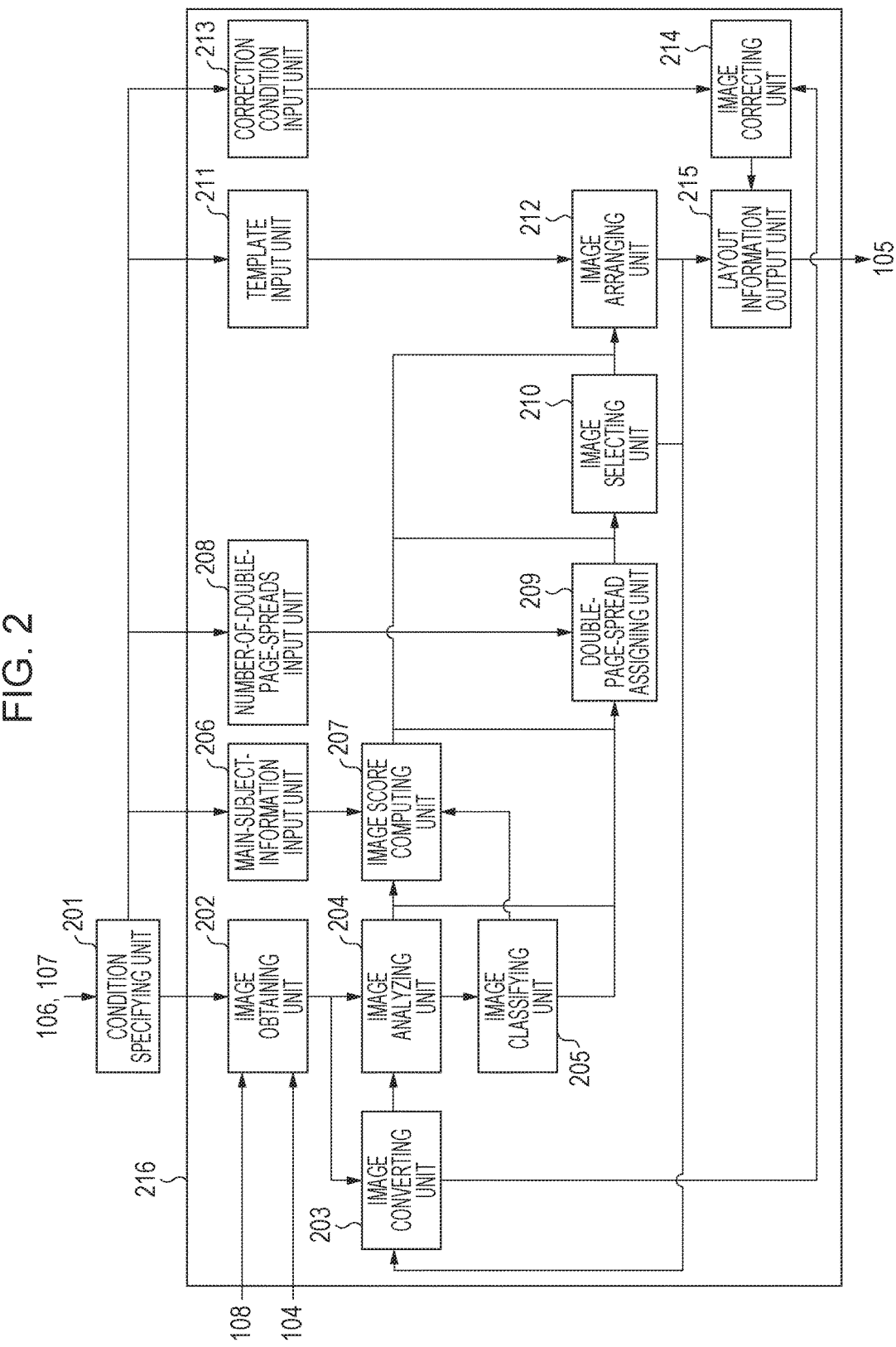
FIG. 2 is a software block diagram of an album creation application.

FIG. 2 is a software block diagram of the album creation application. FIG. 2 is a software block diagram particularly relating to an automatic arrangement processing unit 216 that carries out an automatic arrangement function. With the automatic arrangement function, classification or selection are performed on captured still images and moving images on the basis of content or attributes thereof and the resulting images are arranged, whereby an album image to be displayed on the display 105 is created. The CPU 101 executes the album creation application stored on the HDD 104, thereby functioning as blocks illustrated in FIG. 2.

A condition specifying unit 201 outputs, to the automatic arrangement processing unit 216, album creation conditions that are based on an input, for example, a user UI operation (described later) performed using the pointing device 107. The specified conditions may include, for example, the ID of an image or subject of interest, the number of double-page spreads of an album, template information, an ON/OFF condition regarding image correction, and an ON/OFF condition regarding the use of moving images. Images may be specified by using additional information or attribute information (e.g., image capturing date/time) of individual image data items or on the basis of the structure of a file system including image data items, such as by specifying a device or directory (folder). Note that a "double-page spread" is equivalent to a pair of adjacent pages that is displayed in one display window or is printed on different sheets, for example.

An image obtaining unit 202 obtains an image data group including still images and moving images specified by the condition specifying unit 201 from the HDD 104 or a network server or SNS via the data communication unit 108. An image converting unit 203 converts image data to be used in subsequent processing into image data having a number of pixels or having color information. In the present embodiment, the image converting unit 203 converts image data into analysis-target image data (hereinafter, referred to as an "analysis-target image") having 420 pixels at a shorter side and sRGB color information. An image analyzing unit 204 performs various kinds of processing (described later) including feature quantity derivation, face detection, facial expression recognition, and individual recognition on the analysis-target image. The image analyzing unit 204 also obtains additional data of image data obtained from the HDD 104 or a network via the data communication unit 108, for example, information concerning the image capturing date/time from Exchangeable image file format (Exif) information. Note that information concerning the creation or update date/time of the image file may be used instead of the information concerning the image capturing date/time. In addition, information concerning the server or SNS upload date/time of the image or information concerning the server or SNS download date/time of the image may be used instead of the information concerning the image capturing date/time. Hereinafter, these kinds of date/time information are collectively handled as image capturing date/time information.

An image classifying unit 205 performs scene segmentation and scene classification (described later) on the image data group by using the capturing date/time information, the number of captured images, the detected face information, or the like. The term "scene" refers to an image capturing scene, such as travel, daily life, or a wedding ceremony. Image data corresponding to one scene is considered as a collection of images captured at an image capturing opportunity for one subject and one time period. An image score computing unit 207 computes a score for each image data such that an image more suitable for arrangement has a higher score. The image score computing unit 207 computes a score by using information supplied from the image analyzing unit 204 and information supplied from the image classifying unit 205, which will be described later. The image score computing unit 207 may compute a score by additionally using information other than the information supplied from the image analyzing unit 204 and the image classifying unit 205 or using such information instead of the information supplied from the image analyzing unit 204 and the image classifying unit 205. A main-subject-information input unit 206 inputs, to the image score computing unit 207, the ID (identification information) of the main subject specified by the condition specifying unit 201. The image score computing unit 207 may be configured to compute a higher score for image data including the subject indicated by the main subject ID input from the main-subject-information input unit 206.

A double-page-spread assigning unit 209 divides the image data group into groups (groups the image data group) and assigns each of the groups to a corresponding one of double-page spreads. The number-of-double-page-spreads input unit 208 inputs the number of double-page spreads of an album, which is specified by the condition specifying unit 201, to the double-page-spread assigning unit 209. The number of double-page-spreads corresponds to the number of templates in each of which a plurality of images are to be arranged. The double-page-spread assigning unit 209 divides the image data group into groups in accordance with the input number of double-page spreads and assigns each portion of the image data group (each of the groups) to a corresponding one of the double-page spreads. An image selecting unit 210 selects, for each double-page spread, images from among a portion of the image data group assigned to the double-page spread by the double-page-spread assigning unit 209 on the basis of the score computed by the image score computing unit 207.

An image arranging unit 212 determines a layout of image data. A template input unit 211 inputs a plurality of templates corresponding to template information specified by the condition specifying unit 201 to the image arranging unit 212. The image arranging unit 212 selects a template suitable for the image data selected by the image selecting unit 210 from among the plurality of templates input thereto by the template input unit 211 and determines a layout of the image data. A layout information output unit 215 outputs layout information for display on the display 105 in accordance with the layout of the image data determined by the image arranging unit 212. The layout information is, for example, bitmap data in which the image data selected by the image selecting unit 210 is arranged in the selected template. That is, the layout information output unit 215 functions as an output unit that outputs images selected by the image selecting unit 210. For example, in the case where the images are output to the display 105, the layout information output unit 215 functions as a display control unit. The layout information output unit 215 also functions as a transmission unit in the case where the images are transmitted to an external apparatus connected to the image processing apparatus 100 and functions as a print control unit in the case where the images are transmitted to a printing apparatus connected to the image processing apparatus 100.

An image correcting unit 214 performs corrections, such as brightness correction, red-eye correction, and contrast correction. A correction condition input unit 213 inputs, to the image correcting unit 214, an image correction ON/OFF condition specified by the condition specifying unit 201. The image correction ON/OFF condition may be specified separately for each type of correction or collectively for all types of corrections. If the image correction condition indicates ON, the image correcting unit 214 performs corrections on the image data. If the image correction condition indicates OFF, the image correcting unit 214 does not perform corrections. The image correcting unit 214 performs corrections on the image data input from the image converting unit 203 in accordance with the image correction ON/OFF condition. The number of pixels of image data input from the image converting unit 203 to the image correcting unit 214 is changeable in accordance with the size of the layout determined by the image arranging unit 212. The image data output from the layout information output unit 215 is displayed on the display 105 in a manner as illustrated in FIG. 3, for example.

Once the album creation application is installed on the image processing apparatus 100, a start icon is displayed in a top screen (desktop) of the operating system (OS) running on the image processing apparatus 100. If the user double-clicks the start icon displayed on the display 105 by using the pointing device 107, the program of the album creation application stored on the HDD 104 is loaded to the RAM 104. The program on the RAM 104 is executed by the CPU 101, in response to which the album creation application starts. Note that the image processing apparatus 100 may be configured such that the program is stored on the ROM 102.

Figure 3:
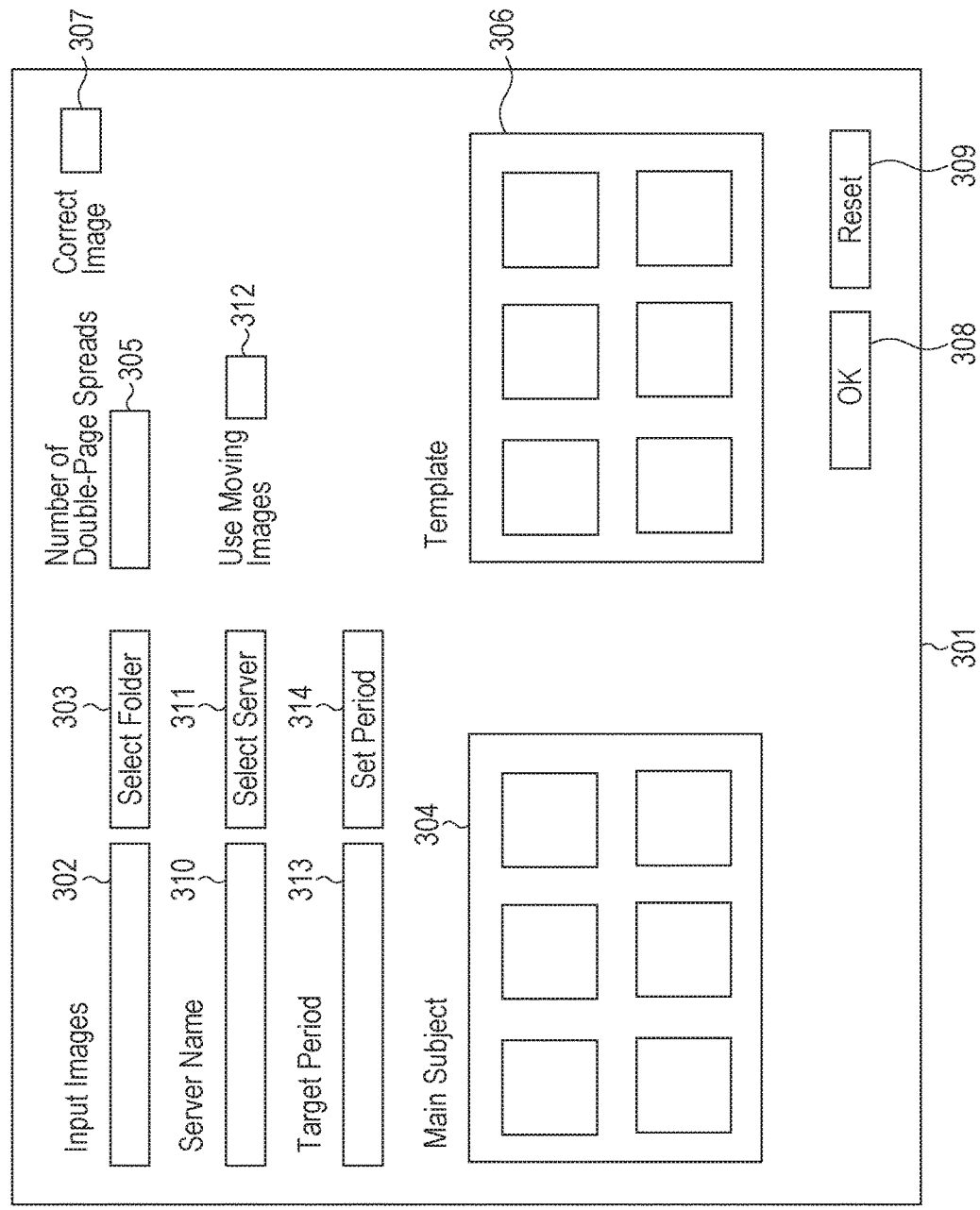
FIG. 3 is a diagram illustrating a display screen provided by the album creation application.

FIG. 3 is a diagram illustrating an example of a display screen 301 provided by the album creation application. The display screen 301 is displayed on the display 105. The user sets album creation conditions (described later) through the display screen 301 and the condition specifying unit 201 obtains content of the settings made by the user.

The display screen 301 includes a path box 302 and a folder selection button 303. The path box 302 displays (a path to) a location on the HDD 104 where an image data group used to create an album is stored. If the user performs a click operation on the folder selection button 303 by using the pointing device 107, folders including the image data group used to create an album are displayed as a list so that a folder is selectable by the user. The path to the folder selected by the user and including the image data group is displayed at the path box 302. Note that the user may directly input the path to the folder including the image data group used to create an album at the path box 302 by using the keyboard 106.

The display screen 301 also includes a server name box 310 and a server selection button 311. The server name box 310 displays the name of a server or SNS including the image data group used to create an album. If the user performs a click operation on the server selection button 311 by using the pointing device 107, the names of servers or SNS that store the image data group used to create an album are displayed as a tree so that the name is selectable by the user. The name of the server or SNS selected by the user and storing the image data group is displayed at the server name box 310. Note that the user may directly input the name of the server or SNS that stores the image data group used to create an album at the server name box 310 by using the keyboard 106.

The display screen 301 also includes a use-of-moving-image checkbox 312. The use-of-moving-image checkbox 312 accepts a user input for specifying whether to use moving images included in the folder displayed at the path box 302 or stored on the server or SNS displayed at the server name box 310 to create an album. The use-of-moving-image checkbox 312 that is checked indicates that moving images are used to create an album, whereas the use-of-moving-image checkbox 312 that is not checked indicates that the moving images are not used to create an album.

The display screen 301 also includes a target period box 313 and a period setting button 314. The target period box 313 displays a period of the image capturing date/time of images used to create an album. If the user performs a click operation on the period setting button 314 by using the pointing device 107, the user can specify a period of the image capturing date/time of the image data group used to create an album. The period of the image capturing date/time of the images used to create an album, which is specified by the user, is displayed at the target period box 313. Note that the user may directly input the period of the image capturing date/time of the images used to create an album at the target period box 313 by using the keyboard 106.

The display screen 301 also includes a main subject specifying icon 304. The main subject specifying icon 304 is an icon that allows the user to specify a main subject that is to be identified as a subject of interest from among subjects in analysis-target images (e.g., photographs). A face image of the subject is displayed as the icon. A plurality of icons of difference face images may be arranged and displayed as the main subject specifying icon 304. For example, face images used as the icon are detected from images in advance, are associated with corresponding individual IDs, and are registered in a face database. The user can manually select a main subject by clicking the main subject specifying icon 304 by using the pointing device 107 to display the face images stored on the face database and selecting one or more face images from among the displayed face images. Face images of subjects specified according to a method illustrated in FIG. 4 (described later) may be displayed as the main subject specifying icon 304.

The display screen 301 also includes a number-of-double-page-spreads input box 305, a template specifying icon 306, and an image correction checkbox 307. The number-of-double-page-spreads input box 305 accepts a setting of the number of double-page spreads of the album from the user. The user can directly input a numerical value at the number-of-double-page-spreads input box 305 by using the keyboard 106 or can input a numerical value at the number-of-double-page-spreads input box 305 from a list by using the pointing device 107. The template specifying icon 306 is displayed as illustration images for respective styles (such as pop and chic). A plurality of template icons are arranged and displayed as the template specifying icon 306, and the user can select a template icon by clicking it using the pointing device 107. The image correction checkbox 307 accepts a user input for specifying ON/OFF of image correction. The image correction checkbox 307 that is checked indicates that ON is specified for image correction, whereas the image correction checkbox 307 that is not checked indicates that OFF is specified for image correction. In the example in FIG. 3, ON or OFF is specified collectively for all of one or more types of corrections.

The display screen 301 also includes an OK button 308 and a reset button 309. If the user presses the OK button 308, the condition specifying unit 201 obtains the content set in the display screen 301. The condition specifying unit 201 outputs the obtained setting content to the automatic arrangement processing unit 216 of the album creation application. At that time, the image obtaining unit 202 is notified of the path input at the path box 302. The main-subject-information input unit 206 is notified of the individual ID of the main subject selected using the main subject specifying icon 304. The number-of-double-page-spread input unit 208 is notified of the number of double-page spreads input at the number-of-double-page-spreads input box 305. The template input unit 211 is notified of the template information selected using the template specifying icon 306. The correction condition input unit 213 is notified of the image correction ON/OFF condition set using the image correction checkbox 307. The reset button 309 is a button for resetting the setting information set in the display screen 301.

If the OK button 308 is pressed when the server name or SNS name is set at the server name box 310, a login screen to the specified server or SNS is displayed. The album creation application accepts a user operation in the displayed login screen and become able to obtain images from the specified server or SNS after the login is successful. In addition, if the OK button 308 is pressed when the period of the image capturing date/time is set at the target period box 313, the album creation application handles an image data group corresponding to the specified period as images used to create an album.

Figure 13:
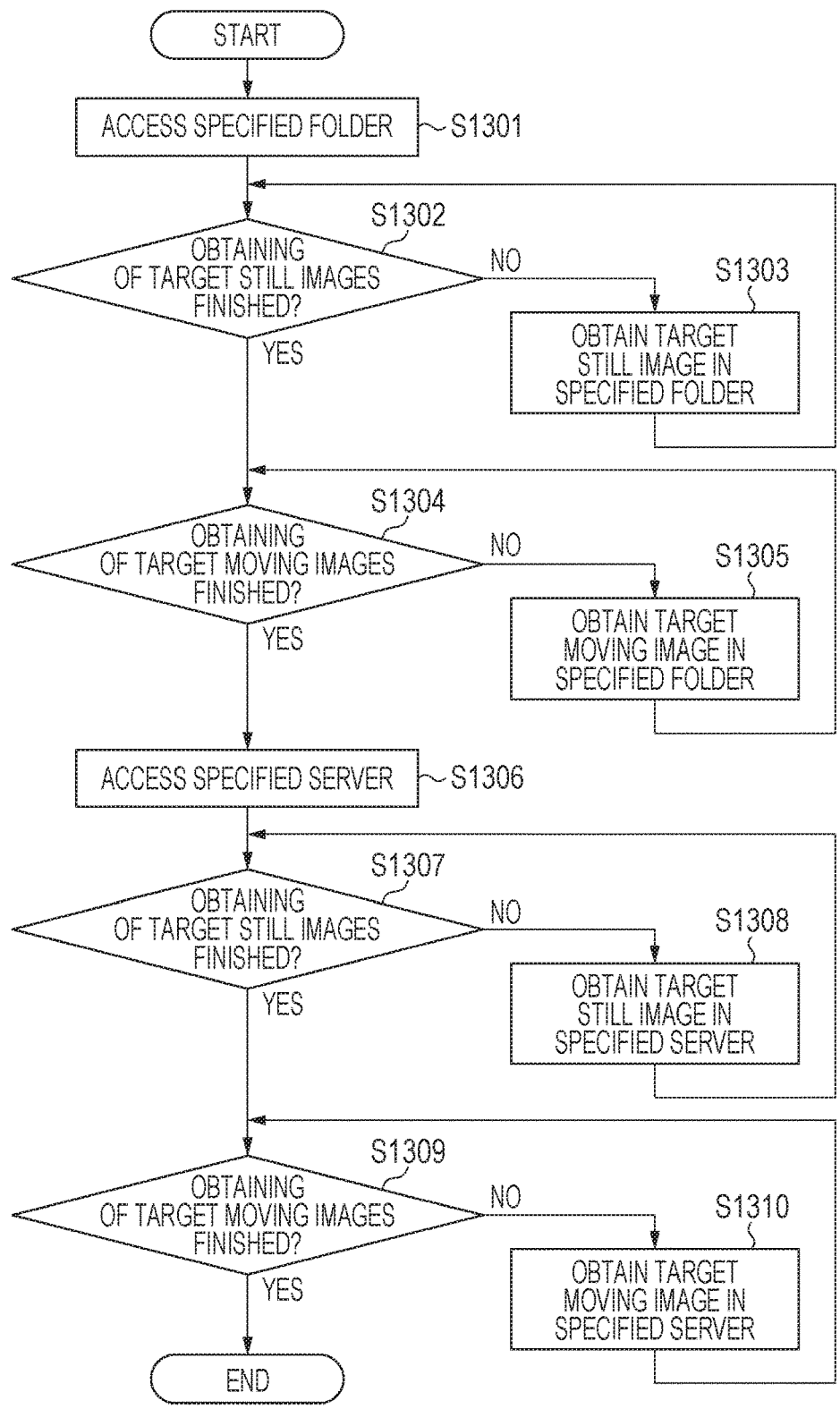
FIG. 13 is a flowchart illustrating an image obtaining process.

Now, various processes relating to an automatic arrangement process for creation of an album will be described. The automatic arrangement process will be described later with reference to FIG. 4. First, a process performed by the image obtaining unit 202 to obtain images subjected to the process illustrated in FIG. 4 will be described with reference to FIG. 13. FIG. 13 illustrates an example of a flow of a process of obtaining still images and moving images from the folder displayed at the path box 302 or the server or SNS whose name is displayed at the server name box 310. The image obtaining unit 202 starts obtaining images in response to the user pressing the OK button 308 by using the pointing device 107, for example.

In S1301, the image obtaining unit 202 accesses the folder displayed at the path box 302. In S1302, the image obtaining unit 202 determines whether all the target still images in the specified folder have been obtained. If the period of the image capturing date/time is displayed at the target period box 313, the image obtaining unit 202 performs the above determination for target still images corresponding to the specified period.

If there is a target still image yet to be obtained (NO in S1302), the image obtaining unit 202 obtains one target still image yet to be obtained (or a plurality of target still images according to circumstances) from the specified folder in S1303. If all the target still images have been obtained (YES in S1302), the image obtaining unit 202 determines whether all the target moving images in the specified folder have been obtained. The image obtaining unit 202 obtains moving images in the specified folder when the use-of-moving-image checkbox 312 is checked and the processing target includes moving images. Accordingly, when the use-of-moving-image checkbox 312 is not checked, the image obtaining unit 202 may determine that all the moving images have been obtained (YES in S1304) even if no moving image in the specified folder has been obtained. In addition, if the period of the image capturing date/time is displayed at the target period box 313, the image obtaining unit 202 performs the above determination for the target moving images corresponding to the specified period.

If there is a target moving image yet to be obtained (NO in S1304), the image obtaining unit 202 obtains one target moving image yet to be obtained (a plurality of target moving images according to circumstances) from the specified folder in S1305. If all the target moving images have been obtained (YES in S1304), the image obtaining unit 202 accesses the server or SNS whose name is displayed at the server name box 310 in S1306. It is assumed that, at this point, login to the server or SNS has completed, access to the server or SNS site including the image data group which the user wants to download has completed, and the images can be downloaded from the server or SNS. Note that the processing such as login and accessing the server or SNS site can be performed in response to a user operation.

In S1307, the image obtaining unit 202 determines whether all the target still images that can be obtained from the specified server or SNS site have been obtained. If the period of the image capturing date/time is displayed at the target period box 313, the image obtaining unit 202 performs the above determination for the target still images corresponding to the specified period.

If there is a target still image yet to be obtained (NO in S1307), the image obtaining unit 202 obtains one target still image that is yet to be obtained (or a plurality of target still images according to circumstances) and that can be obtained from the specified server or SNS site in S1308. If all the target still images have been obtained (YES in S1307), the image obtaining unit 202 determines whether all the target moving images that can be obtained from the specified server or SNS site have been obtained in S1309. The image obtaining unit 202 obtains moving images from the specified server or SNS site when the use-of-moving-image checkbox 312 is checked and the processing target includes moving images. Accordingly, when the use-of-moving-image checkbox 312 is not checked, the image obtaining unit 202 may determine that all the moving images have been obtained (YES in S1309) even if no moving image in the specified server or SNS site has been obtained. In addition, if the period of the image capturing date/time is displayed at the target period box 313, the image obtaining unit 202 performs the above determination for the target moving images corresponding to the specified period.

If there is a target moving image yet to be obtained (NO in S1309), the image obtaining unit 202 obtains one target moving image yet to be obtained from the specified server or SNS site (or a plurality of target moving images according to circumstances) in S1310. If all the target moving images have been obtained (YES in S1309), the image obtaining unit 202 ends the image obtaining process.

The obtained images are stored on the HDD 104, for example. Images already stored on the HDD 104 are not stored again on the HDD 104, and a path or link to the image file stored on the HDD 104 may be stored on the HDD 104. When generating an analysis-target image, the image converting unit 203 (described later) can obtain an image from the HDD 104 by using the path or link to the image file stored on the HDD 104 and generate the analysis-target image.

An example of collectively obtaining images at the start of the process has been described with reference to FIG. 13; however, processing of S401 to S404 (described later) may be performed after obtaining one image, and then the process returns to S401 to obtain the next image if NO is determined in S405 (described later). In addition, any of the following four methods may be used.

A first method is as follows. For target images specified using the path box 302, processing of S401 to S405 is performed after one target image is obtained, and then the next target image is obtained. This is repeatedly performed. For target images specified using the server name box 310, the target images are collectively obtained at the start of the processing.

A second method is as follows. For both target images specified using the path box 302 and target images specified using the server name box 310, processing of S401 to S405 is performed after one target image is obtained, and then the next target image is obtained. This is repeatedly performed.

A third method is as follows. Target images specified using the path box 302 and the server name box 310 are collectively obtained at the start of processing.

A fourth method is as follows. Target images specified using the path box 302 are collectively obtained at the start of processing, whereas for target images specified using the server name box 310, processing of S401 to S405 is performed after one target image is obtained, and then the next target image is obtained. This is repeatedly performed.

Figure 4:
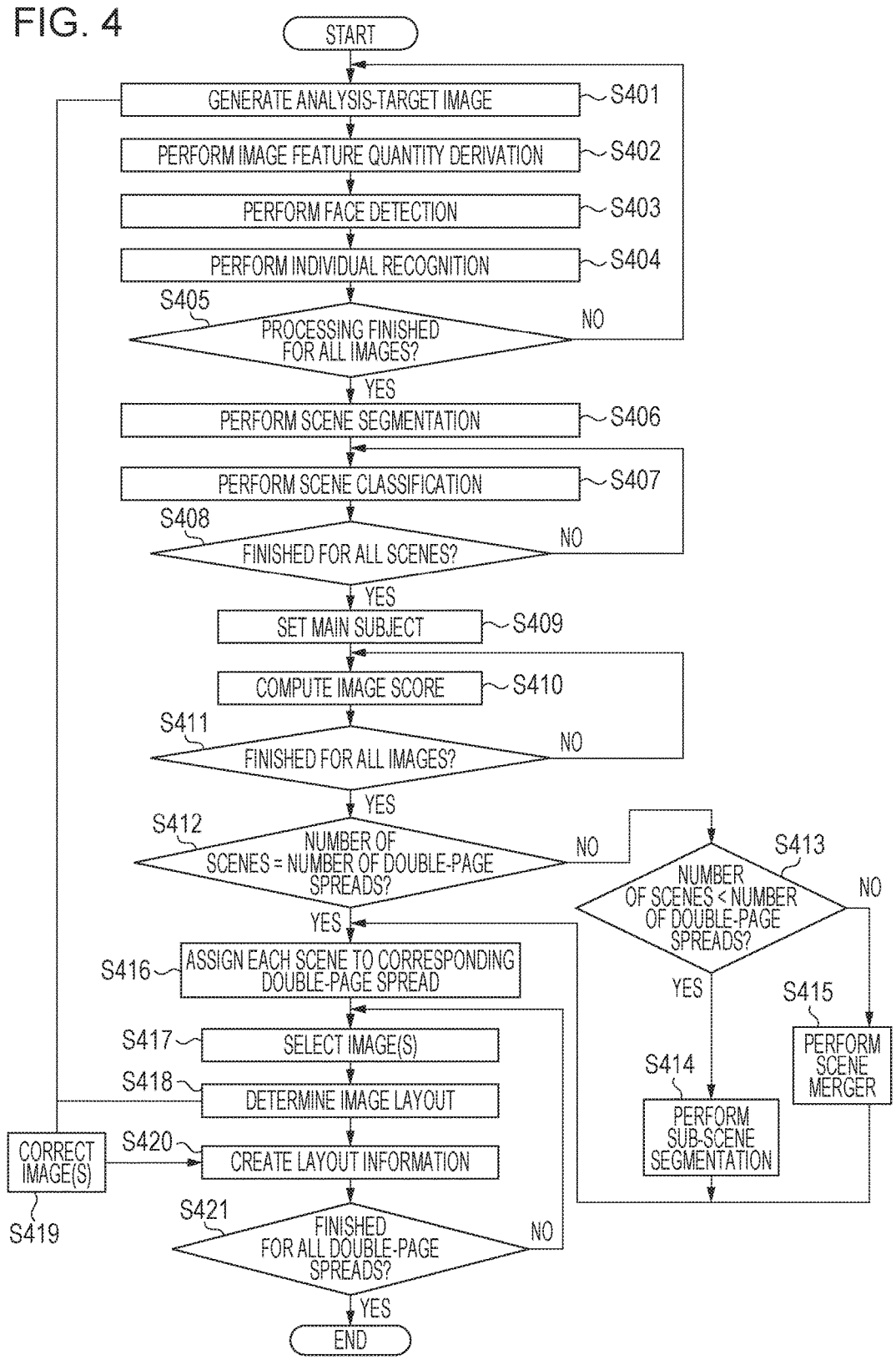
FIG. 4 is a flowchart illustrating an automatic arrangement process.

The flow of the automatic arrangement process performed by the automatic arrangement processing unit 216 of the album creation application by using the images obtained in the above-described manner will be described next with reference to FIG. 4. The process illustrated in FIG. 4 is implemented as a result of the CPU 101 loading a program stored on the HDD 104 or the ROM 102 into the RAM 103 and executing the program, for example.

Figure 11:
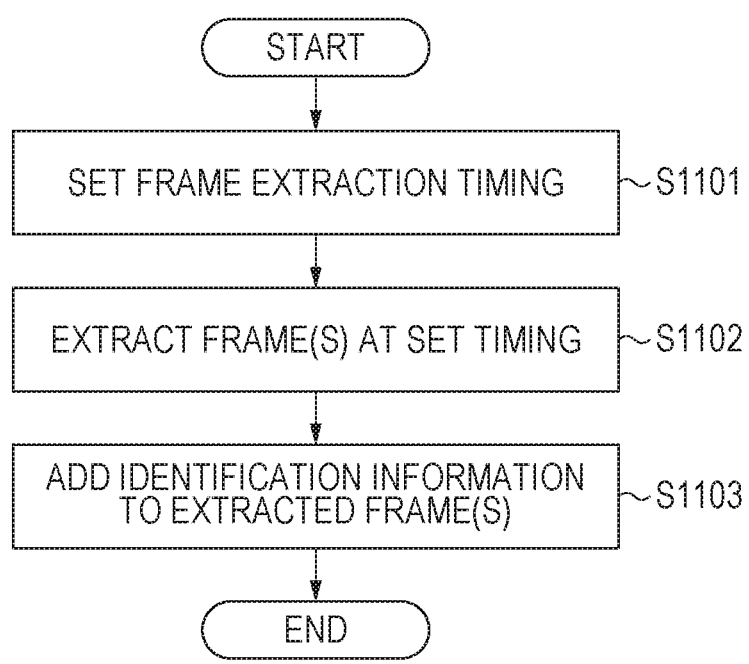
FIG. 11 is a flowchart illustrating a frame extraction process of extracting a frame from a moving image.

In S401, the image converting unit 203 sequentially selects an image from among the images obtained by the image obtaining unit 202 and generates an analysis-target image. The image converting unit 203 converts each image data of the obtained image data group into an analysis-target image having a number of pixels and color information. In the present embodiment, the image is converted into an analysis-target image having 420 pixels at a shorter side and sRGB color information. Note that the image converting unit 203 converts each frame extracted from a target moving image into an analysis-target image. A process of extracting a frame from a moving image will be described with reference to FIG. 11.

In S1101, timings at each of which a frame is extracted from a target moving image obtained as illustrated in FIG. 13 are set. The frame extraction timings can be set using predetermined intervals, such as every second or every 5 seconds, for example. The frame extraction timing may be set by performing a calculation based on duration of the moving image and the number of frames to be extracted. For example, if 30 frames are extracted from a 1-minute (60-second) moving image, frames are extracted at intervals of 60/30=2 seconds. Accordingly, in this case, the frame extraction timings are set as intervals of 2 seconds. A table that specifies the frame extraction timings for duration of a moving image may be used. For example, specific timings, such as 1 second, 3 seconds, and 6 seconds of a moving image are stored in a table, and frames at time points from the start of the moving image that respectively correspond to the timings stored in the table may be extracted. Note that the number of frames to be extracted may be changed in accordance with the duration.

In S1102, one or more frames are extracted from the target moving image at the set timings. In S1103, identification information is added to each extracted frame. Identification information is information concerning the source of the moving image (i.e., the location from which the moving image is obtained) and may be, for example, information regarding the specified folder, the specified server, or the specified SNS. In addition, the identification information may include image capturing date/time information, the size of the extracted frame, and duration of the moving image from which the frame is extracted.

Referring back to FIG. 4, in S402, the image analyzing unit 204 derives an image feature quantity of an image of interest. The image analyzing unit 204 obtains the image capturing data/time information from, for example, Exif information that accompanies the image of interest. If the image of interest is not accompanied with the image capturing date/time information, image file creation or update date/time or image file upload/download date/time may be used instead of image capturing date/time as described above. In addition, the image analyzing unit 204 obtains the number of pixels of the image of interest from the Exif information or identification information added when the image of interest is obtained. The image analyzing unit 204 derives a feature quantity from analysis-target pixels of the image of interest. The feature quantity may be related to focus, for example.

For example, edge detection is performed using the Sobel filter, which is generally known as an edge detection method, and a difference in brightness at the start point and the end point of the edge is divided by a distance between the start point and the end point. In this way, an edge inclination, that is, a brightness gradient can be calculated. Based on calculated result of an average inclination of edges in the target image, an image having a larger average inclination can be considered to be an image more sharply focused than an image having a smaller average inclination. Accordingly, the value of the average inclination can be used as a feature quantity. In this case, an evaluation value of an in-focus degree can be output by setting a plurality of different thresholds for the average inclination and determining which threshold the calculated average inclination is greater than or equal to. In the present embodiment, two different thresholds (a first threshold and a second threshold, where the first threshold> the second threshold) are set in advance, and the in-focus degree is determined using three steps of good (○), intermediate (Δ), and poor (X). For example, if the calculated average inclination is greater than or equal to the first threshold, the in-focus degree is good (○). If the calculated average inclination is smaller than the first threshold and is greater than or equal to the second threshold, the in-focus degree is permissible (Δ). If the calculated average inclination is smaller than the second threshold, the in-focus degree is not permissible (X). The thresholds are set in advance such that the average inclination desired for an album corresponds to good (○), the permissible average inclination corresponds to intermediate (Δ), and the impermissible average inclination corresponds to poor (X). The thresholds may be provided by, for example, a creator of the album creation application (for example, as values based on a result of an experiment or the like) or may be set through a user interface. In addition, different values may be set for good (○), intermediate (Δ), and poor (X) as the in-focus degree.

For edges detected using the Sobel filter, a pixel having the largest brightness peak value and a pixel having the smallest brightness peak value are identified by referring to adjacent pixels, and the width between these two pixels may be identified as the in-focus degree. In this case, when the width between the pixels is narrow, the image can be considered to be in focus, for example. In addition, a plurality of thresholds may be set for the width between the pixels, and the evaluation result in three steps of good (○), intermediate (Δ), and poor (X) may be used as the in-focus degree as described above. In addition, different values may be set for good (○), intermediate (Δ), and poor (X) as the in-focus degree.

In S403, the image analyzing unit 204 performs face detection on the analysis-target image generated in S401. A known method can be used in this face detection process. For example, AdaBoost, which creates a strong classifier from a plurality of prepared weak classifiers, can be used. In the present embodiment, a face area of a person (object) is detected from the detection-target image by using the strong classifier created by the AdaBoost. The image analyzing unit 204 extracts a face image and obtains the upper left coordinate value and the lower right coordinate value of the position of the detected face area. With these two coordinate values, the image analyzing unit 204 can obtain the position and size of the face area. Note that the detection target is not limited a face, and a strong classifier may be created by AdaBoost by setting an object such as an animal, for example, a dog or cat, a flower, a food, a building, and a decorative object as the detection target instead of a face. In this way, the image analyzing unit 204 can detect an object other than the face image.

In S404, the image analyzing unit 204 performs individual recognition by comparing the face image detected in S403 with each representative face image stored on a face dictionary database in association with a corresponding individual ID to determine a similarity score. The image analyzing unit 204 determines the ID of the representative face image having the highest similarity score that is higher than or equal to a threshold as the ID of the detected face image. If the similarity score is less than the threshold, the image analyzing unit 204 registers the extracted face image as a new face image in the face dictionary database in association with a new individual ID.

The image analyzing unit 204 stores, for each image ID 501 that identifies an image, image analysis information 500 obtained in S402 to S404 in a storage area of the RAM 103 or the like as illustrated in FIG. 5. For example, as illustrated in FIG. 5, image capturing date/time information 502, a focus determination result 503 obtained in S402, the number of faces (face areas) 504, and position information 505 detected in S403 are stored in a table format. Note that the position information 505 of the face image is stored separately for each individual ID obtained in S404.

In S405, it is determined whether the processing of S401 to S404 has been finished for all the image data items of the image data group obtained from the HDD 104 or the network server or SNS specified by the condition specifying unit 201 via the communication unit 108. If it is determined that the processing has not been finished (NO in S405), the processing is repeated from S401. If it is determined that the processing has been finished (YES in S405), the process proceeds to S406.

In S406, the image classifying unit 205 performs scene segmentation. The image classifying unit 205 divides the image data group into a plurality of scenes on the basis of a time difference between images which is calculated from the image capturing date/time information obtained in S402. In the present embodiment, scene segmentation is performed, for example, in accordance with criteria as follows.

1. If there is a day on which no image has been captured between image data items, the image data group is divided at that point.

2. If the image capturing dates of image data items are consecutive but the time difference in image capturing date/time between the image data items is 16 hours or more, the image data group is divided at that point.

3. In the case where the image capturing dates of image data items are consecutive and the time difference in image capturing date/time between the image data items is less than 16 hours, if the time difference between the start and the end of image capturing on each of the consecutive dates is less than 4 hours, the image data group is divided at that point.

4. In the case where the image capturing dates of image data items are consecutive and the time difference in image capturing date/time between the image data items is less than 16 hours and the time difference between the start and the end of image capturing on each of the consecutive dates is 4 hours or more, if the number of images captured on each of the consecutive dates is less than 50, the image data group is divided at that point.

5. The image data group is not divided in the case other than the above cases.

Figure 6A:
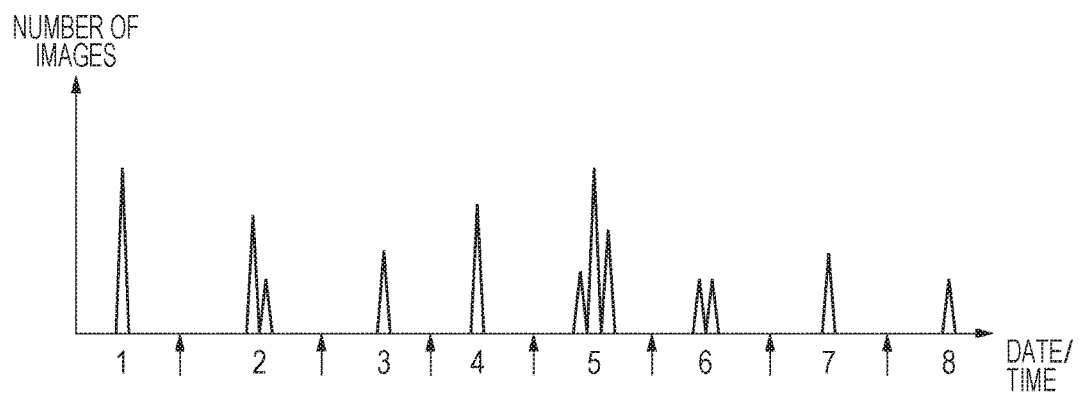
FIGS. 6A to 6C are diagrams each illustrating an image-data-group division result.

The image classifying unit 205 first sets an image having the oldest image capturing date/time among the image data group as an image of interest, and refers to a time difference between the oldest image and the next oldest image. The image classifying unit 205 then refers to the time difference by using the similar method while sequentially replacing the image of interest with an image having a later image capturing date/time to determine whether any of the above condition is satisfied. The image classifying unit 205 may refer to the time difference and determine whether to perform segmentation sequentially from the newest image to the oldest image of the image data group. Note that the term "segmentation" indicates dividing (grouping) the image data group into a group with relatively old image capturing date/time and a group with relatively new image capturing date/time at a point between two images of interest. FIG. 6A is a diagram illustrating an example of a result obtained by performing scene segmentation on the image data group according to the scene segmentation method described above. The segmentation may be performed by using other criteria. For example, in the case where additional information of images includes information about the image capturing location, the image classifying unit 205 may divide the image data group into groups for different image capturing locations on condition that the image capturing locations are apart from each other by a predetermined distance or more even if the image data group does not satisfy the above segmentation conditions regarding time.

Figure 7:
FIG. 7 is a diagram illustrating averages and standard deviations of respective scores for each scene.

In S407, the image classifying unit 205 performs scene classification. In the present embodiment, the image classifying unit 205 classifies each image data segment resulting from scene segmentation into one of scenes of travel, daily life, and ceremony. It is assumed that the user may collect and specify a plurality of image data items that are determined to be scenes of travel, daily life, and ceremony before the automatic arrangement process illustrated in FIG. 4 is started. The image classifying unit 205 then derives a feature quantity for an image data group including some or all of the plurality of image data items. Examples of the feature quantity derived here include an image capturing period, the number of captured images, and the number of subjects. The image capturing period is a time difference between the first image capturing and the last image capturing of the image data group. The number of captured images is the number of images included in the image data group. The number of subjects is the number of faces included in each image data. The average and the standard deviation of the image capturing period, the average and the standard deviation of the number of captured images, and the average and the standard deviation of the number of people per image are derived for each of the plurality of image data groups collected for the respective scenes. FIG. 7 illustrates an example of a table 700 of the derived averages and standard deviations. The program of the album creation application may include the table 700 illustrated in FIG. 7. The average and the standard deviation are registered in the table 700 for an image capturing period 702, the number of captured images 703, and the number of subjects 704 in association with a scene ID 701.

In S407, the averages of the image capturing period, the number of captured images, and the number of subjects are calculated for each of the image data segments obtained by performing in S406 scene segmentation on the image data group specified by the user using the path box 302 or the server name box 310 after the album creation application has been started. The image classifying unit 205 then computes, for each image data segment, scores for the feature quantities of the image capturing period, the number of captured images, and the number of subjects by using the averages and the standard deviations of each scene in FIG. 7 in accordance with Equations (1) and (2) below.

$$\text{Score} = 50 - |10 \times (\text{Average} - \text{Feature Quantity})/\text{Standard Deviation}| \quad (1)$$

$$\text{Average Score} = (\text{Score for Image Capturing Period} + \text{Score for Number of Captured Images} + \text{Score for Number of Subjects})/\text{Number of Feature Quantity Items} \quad (2)$$

Here, the calculation is performed for each of the image capturing period, the number of captured images, and the number of subjects by using Equation (1), and then a calculation is performed by using Equation (2) from calculation results of Equation (1). These calculations are performed for each scene, and the average scores for the respective scenes are calculated for one segment. The values registered in the table 700 are used as the average and standard deviation in Equation (1). Each of the image capturing periods, the number of captured images, and the number of subjects of each segment is used as the feature quantity. In this example, the number of feature quantity items is three.

As a result of the above calculations, average scores for the respective scenes of travel, daily life, and ceremony are derived for image data of each segment. The image classifying unit 205 then classifies the image data of each segment into a scene corresponding to the highest score among the calculated average scores. If the same score is derived for a plurality of scenes, the image data of the segment is classified in accordance with a predetermined scene priority. For example, in the present embodiment, the priority is set such that daily life>ceremony>travel, that is, the scene of daily life has the highest priority. For example, it is assumed that the image capturing period, the number of captured images, and the number of subjects for an image data group 5 resulting from scene segmentation performed as illustrated in FIG. 6A are 36 hours, 300 images, and 1.7 people, respectively. In this case, the average score for the scene of travel calculated using Equations (1) and (2) is 45.32, the average score for the scene of daily life is 18.38, and the average score for the scene of ceremony is −29.92. Accordingly, the image data group 5 is classified into the scene of travel. The image classifying unit 205 manages the classified image data group by assigning a scene ID to the image data group so that the classified scene can be identified.

In S408, it is determined whether scene classification of S407 has been finished for all the segments obtained in S406. If it is determined that scene classification has not been finished (NO in S408), the processing of S407 is repeated. If it is determined that scene classification has been finished (YES in S408), the process proceeds to S409.

In S409, the image score computing unit 207 performs main subject setting. The main subject setting is performed for an image data group specified by the user in accordance with one of two setting methods, i.e., an automatic method and a manual method. The image score computing unit 207 is able to derive the number of times each individual ID appears in the image data group, the number of times each individual ID appears in each scene, and the number of scenes in which each individual ID appears from the result of individual recognition performed in S404 and the result of scene segmentation performed in S406. The image score computing unit 207 is able to automatically set the main subject based on these pieces of information without requiring the user to specify the main subject. In the present embodiment, if there are a plurality of scenes, the image score computing unit 207 sets the individual ID of a subject that appears the most in the plurality of scenes as the main subject ID. If there is a single scene, the image score computing unit 207 sets the individual ID of a subject that appears the most in the single scene as the main subject ID. In addition, if the user specifies the main subject by using the main subject specifying icon 304, the main-subject-information input unit 206 notifies the image score computing unit 207 of the specified individual ID. If the individual ID is specified by the user, the image score computing unit 207 sets the individual ID specified by the user as the main subject ID instead of the main subject ID automatically set in the above manner. This setting method is called a manual setting.

In S410, the image score computing unit 207 performs score assignment. Score assignment is assigning a score obtained by evaluating each image data item in each perspective (described below) (scoring), and the assigned score is referred to when the image data item for use in a layout is selected. FIGS. 10A1 to 10D4 are diagrams illustrating a template group used for image data arrangement. Each of a plurality of templates included in the template group corresponds to a double-page spread. A template 1001 is a single template, in which a slot 1002 is a main slot and slots 1003 and 1004 are sub-slots. The main slot 1002 is a main slot (frame in which an image is arranged) in the template 1001 and is larger than the sub-slots 1003 and 1004. The image score computing unit 207 assigns both a score for the main slot and a score for the sub-slot to each image data item.

FIG. 8A is a diagram describing characteristics of images used for the main slot and characteristics of images used for the sub-slot in an album for each of scenes of travel, daily life, and ceremony. In the table illustrated in FIG. 8A, a plurality of image data items determined to satisfy characteristics of images suitable for the main slot of each scene and a plurality of image data items determined to satisfy characteristics of images suitable for the sub-slot of each scene are collected in advance. For each of the collected image data items, feature quantities such as the number of faces, the positions of the faces, and the sizes of the faces included in the image data item are extracted in advance. The average and the standard deviation of these feature quantities are determined for each scene corresponding to the collected image data item and for each slot type (each of the main slot and the sub-slot), and the averages and the standard deviations are stored together with the program of the album creation application.

The image score computing unit 207 is able to determine which scene each of the image data items belong to on the basis of the result of scene classification performed in S407. The image score computing unit 207 calculates the average score according to Equations (3) and (4) by using the average and the standard deviation determined in advance for the scene of the image data item of interest and the feature quantities such as the number of faces, the position of the face, and the size of the face corresponding to the main subject ID in the image data item of interest.

$$\text{Score} = 50 - |10 \times (\text{Average} - \text{Feature Quantity})/\text{Standard Deviation}| \tag{3}$$

$$\text{Average Score} = (\text{Score for Number of Faces} + \text{Score for Position of Face} + \text{Score for Size of Face})/\text{Number of Feature Quantity Items} \tag{4}$$

The image score computing unit 207 performs the above-described score assignment for both the main slot and the sub-slot. Since an image that is in focus is suitable as an image used in an album, predetermined points may be added to the score of each image data item indicated by the image ID associated with a good (○) feature quantity regarding focus in FIG. 5. FIG. 8B illustrates an example of scores resulting from the score assignment. The scores for the main slot and the sub-slot are assigned for each image ID. That is, in the present embodiment, a condition suitable for the main slot and a condition suitable for the sub-slot are determined for each scene as illustrated in FIG. 8A, and image data items determined to be suitable for the respective conditions are collected in advance. The feature quantities such as the number of faces, the position of the face, and the size of the face are obtained for the collected image data items, and the average and the standard deviation are determined for each of the feature quantities. Then, once the automatic arrangement process of FIG. 4 is started, assignment of a score indicating the similarity to the user determination criteria (conversion of the similarity into numerical value), such as how much each image data item (classified into a scene) subjected to the automatic arrangement process is suitable for the main slot. For example, referring to FIG. 8B, image data having the image ID "1" is assigned 20 points for the main slot, whereas image data having the image ID "2" is assigned 45 points for the main slot. This indicates that the image data having the image ID "2" is closer to the user determination criteria than the image data having the image ID "1" as image data used for the main slot. In a table 800 illustrated in FIG. 8B, a result 802 of score assignment for the main slot and the sub-slot is registered for each image ID 801. Details of the processing of S410 will be described with reference to FIG. 12 later.

In S411, the image score computing unit 207 determines whether the image score assignment of S410 has been finished for all the image data items in the image data group specified by the user. If it is determined that the image score assignment has not been finished (NO in S411), the processing of S410 is repeated. If it is determined that the image score assignment has been finished (YES in S411), the process proceeds to S412.

In S412, the double-page-spread assigning unit 209 determines whether the number of scenes obtained by scene segmentation performed in S406 is equal to the number of double-page spreads of an album that is input by the number-of-double-page-spreads input unit 208. If it is determined that the numbers are not equal (NO in S412), the process proceeds to S413. If it is determined that the numbers are equal (YES in S412), the process proceeds to S416. For example, if the number of scenes obtained by segmentation is equal to 8 as illustrated in FIG. 6A and the number of double-page spreads input by the number-of-double-page-spreads input unit 208 is equal to 8, the process proceeds to S416.

In S413, the double-page-spread assigning unit 209 determines whether the number of scenes obtained by the scene segmentation in S406 is less than the number of double-page spreads input by the number-of-double-page-spreads input unit 208 (the number of templates used in an album). If it is determined that the number of scenes obtained by segmentation is more than the number of double-page spreads (NO in S413), the process proceeds to S415. If it is determined that the number of scenes obtained by segmentation is less than the number of double-page spreads (YES in S413), the process proceeds to S414. For example, if the number of scenes obtained by segmentation is equal to 8 as illustrated in FIG. 6A and the number input by the number-of-double-page-spreads input unit 208 is equal to 10, the process proceeds to S414.

Figure 6B:
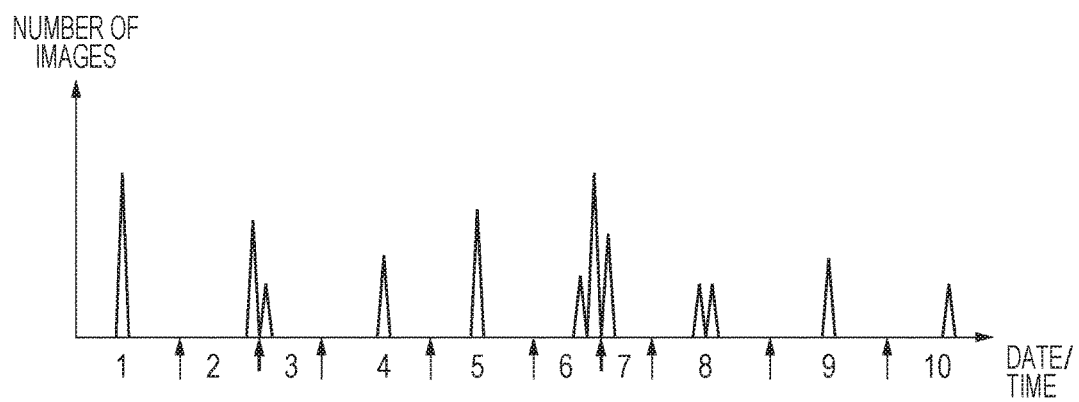

In S414, the double-page-spread assigning unit 209 performs sub-scene segmentation. Sub-scene segmentation is to further divide a scene obtained by segmentation if the number of scenes obtained by the segmentation is less than the number of double-page spreads of an album. A description will be given of the case where the number of scenes obtained by the segmentation is equal to 8 as in FIG. 6A and the specified number of double-page spreads of an album is equal to 10. FIG. 6B illustrates a result obtained by performing sub-scene segmentation in FIG. 6A. In FIG. 6B, sub-scene segmentation is performed at two points indicated by thick arrows in the state illustrated in FIG. 6A, and the number of scenes after the sub-scene segmentation is equal to 10.

Criteria of segmentation will be described. A scene including many images is searched for from among the scenes obtained by segmentation illustrated in FIG. 6A. In this case, to increase the number of scenes from 8 to 10, that is, by 2, two scenes including many images are searched for. A scene having a larger difference in the image capturing date/time between images is selected from among scenes including the same number of images. If the target scene is not determined even with the above criteria, a selection criterion such as dividing an image group with older time points again may be further set. Referring to FIG. 6A, an image group 5 includes the largest number of images, and image groups 1 and 2 include the next largest number of images. Although the image groups 1 and 2 include the same number of images, the image group 2 is selected as a target of segmentation since the image group 2 has a larger time difference between the first image and the last image. Each of the image groups 5 and 2 is divided.

Since the image group 2 has two peaks in terms of the number of images (with different image capturing dates, for example), the image group 2 is divided at a point of a thick arrow in FIG. 6B corresponding to this part. On the other hand, since the image group 5 has three peaks in terms of the number of images (with different image capturing dates, for example). In this case, there are two possible segmentation candidate points, for example, the points at which the image capturing date changes. In this case, the image group 5 is divided at a point of a thick arrow in FIG. 6B to decrease a difference in the number of images after the segmentation. In general, if a selected scene includes images assigned different image capturing dates, re-segmentation of the scene is performed so that image data groups with different image capturing dates are included in respective new scenes. If the image capturing date indicates three or more days, re-segmentation is performed so that the difference in the number of images included in respective scenes becomes smallest and images assigned the same image capturing date is included in the same scene. In the above-described manner, the number of scenes obtained by segmentation is increased from 8 to 10. Segmentation is performed at a point where the image capturing date changes in this example. If the scene includes many images assigned a single date, segmentation may be performed at a point where the time difference is the largest within the day. Through the procedure described above, the number of double-page spreads and the number of image groups are made equal. Note that scene classification may be performed for the image groups generated by re-segmentation or the scene classification result of the original image group subjected to the re-segmentation may be continuously used. It is assumed in the present embodiment that the scene classification result of the original image group is continuously used.

Figure 6C:
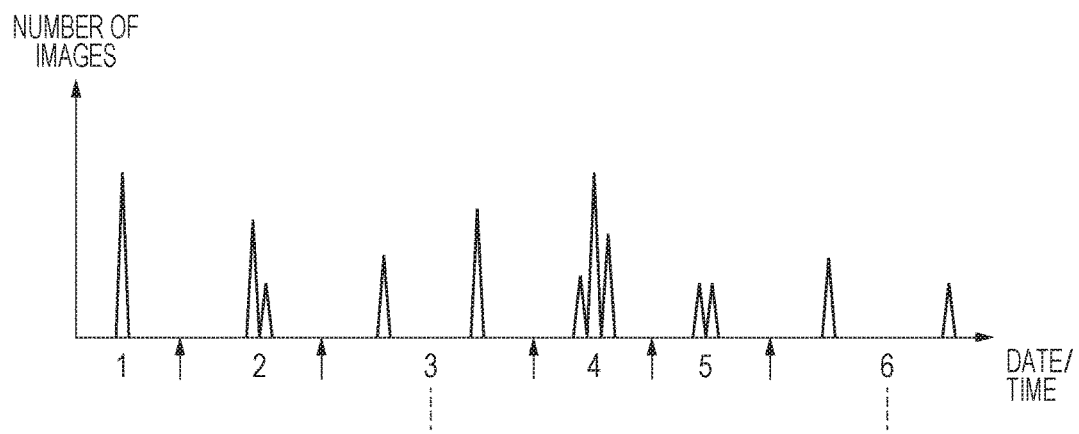

In S415, the double-page-spread assigning unit 209 performs merger of image groups when the number of image groups is more than the number of double-page spreads. FIG. 6C illustrates a result of merger of image groups obtained by segmentation illustrated in FIG. 6A. Image groups, which have been divided at a point of a dashed line, are merged, and the number of scenes becomes equal to 6.

Criteria of merger will be described. Image groups including a small number of images are searched for from among the image groups. An image group whose neighboring image group is not selected as a target of merger is specified as the target of merger from among image groups including the same number of images. In the example in FIG. 6A, two points having a small number of images are identified in order to decrease the number of scenes from 8 to 6, that is, by 2. In FIG. 6A, an image group 8 includes the smallest number of images, and image groups 3 and 7 include the next smallest number of images. The image groups 3 and 7 include the same number of images; however, since the image group 8 neighboring the image group 7 is selected as the target of merger, the image group 3 is selected as the target of merger. As a result, merger is performed on each of the image groups 8 and 3.

When image groups are merged, an image group to which the merger-target image group is merged is determined from among an image group having preceding image capturing date/time and an image group having subsequent image capturing date/time. During this determination, an image group having a smaller time difference in the image capturing date/time is selected as a partner of merger from among two image groups neighboring the merger-target image group. In FIG. 6A, since the image group 3 is determined as the merger target as described above, the image group 3 is merged to one of its neighboring image groups 2 and 4. In FIG. 6A, when the time difference between the image groups 3 and 2 is compared with the time difference between the image groups 3 and 4, the time difference between the image groups 3 and 4 is smaller than that between the image groups 3 and 2. Accordingly, the image group 3 is merged into the image group 4. In this way, merger is performed at a point indicated by a dashed line in FIG. 6C. On the other hand, since the image group 8 has only one neighboring image group, the image group 8 is merged to the only one neighboring image group (image group 7) at a point indicated by a dashed line in FIG. 6C. Note that merger includes, for example, updating information representing image files included in the image group in accordance with an image group resulting from the merger.

In S416, the double-page spread assigning unit 209 performs double-page spread assignment. The number of scenes is made equal to the specified number of double-page spreads through S412 to S415. Accordingly, the double-page spread assigning unit 209 sequentially assigns the image groups to the respective double-page spreads in the order of the image capturing date/time.

In S417, the image selecting unit 210 selects one or more images. An example of selecting four image data items from the image group assigned to a double-page spread will be described below with reference to FIGS. 9A to 9J.

An interval from the start to the end illustrated in FIG. 9A indicates a time difference (divided image capturing period) from the image capturing date/time of the first image data and the image capturing date/time of the last image data of an image group assigned to a double-page spread. A method for selecting the first image will be described with reference to FIG. 9B. The template 1001 includes one main slot 1002. Accordingly, image data for the main slot is selected as the first image. The image data assigned the highest score for the main slot, which has been assigned in S410, is selected from among the plurality of image data items corresponding to the image capturing period of the image group illustrated in FIG. 9B. The image capturing date/time of this selected image data is illustrated as (1) in FIG. 9B. Image data for the sub-slot is selected as the second and subsequent images.

In the present embodiment, the images are selected so that the image capturing dates/times of the selected image data items does not concentrate in a portion of the image capturing period of the image group. A method for fractioning the image capturing period of the image group according to the present embodiment will be described below. First, the image capturing period of the image group is divided into two as illustrated in FIG. 9C. Then, the second image data is selected from among image data items corresponding to an image capturing period, indicated by a solid line, from which the first image is not selected, as illustrated in FIG. 9D. For example, image data having the highest score for the sub-slot is selected from among the plurality of image data items corresponding to the image capturing period indicated by the solid line in FIG. 9D.

Next, each of the two divisional image capturing periods illustrated in FIG. 9D are further divided into two as illustrated in FIG. 9E. Then, as illustrated in FIG. 9F, for example, image data having the highest score for the sub-slot is selected as the third image data from among a plurality of image data items corresponding to an image capturing period, indicated by a solid line, from which none of the first image data and the second image data have been selected.

The case where there are no image data items in an image capturing period from which an image data item is to be selected and thus no image is selectable will be described by using selection of the fourth image data item as an example. FIG. 9G illustrates a situation where it is attempted to select the fourth image data from the hatched image capturing period from which no image data has been selected yet but there is no image data in this hatched image capturing period. In this case, each of the divisional image capturing periods is further divided into two as illustrated in FIG. 9H. Then, for example, image data having the highest score for the sub-slot is selected as the fourth image data from among the plurality of image data items corresponding to an image capturing period, indicated by a solid line, from which none of the first image data, the second image data, and the third image data have been selected as illustrated in FIG. 9I.

Referring back to FIG. 4, in S418, the image arranging unit 212 determines an image layout. The image arranging unit 212 selects a template in which the position of the main slot corresponds to a chronological position of the image selected for the main slot of the scene of interest, from the candidate template group input by the template input unit 211. It is assumed in the present embodiment that image data having the older image capturing date/time is arranged at the upper left portion of the template and image data having the newer image capturing date/time is arranged at the lower right portion of the template. Since associating the position and the image separately for each slot is troublesome, templates can be grouped in accordance with the positions of the main slot and the sub-slots, and the grouped templates can be further grouped in accordance with the orientation of the images (portrait or landscape), for example. The templates are narrowed down in accordance with the chronological position and the orientation of the main-slot image, and similar narrowing-down is performed for the sub-slot of the resultant templates. In this way, the template input unit 211 can narrow down the candidate templates and determine the template that is to be used.

Now, an example in which the template input unit 211 uses templates illustrated in FIGS. 10A1 to 10D4 as candidate templates for a double-page spread in accordance with the specified template information will be described. As illustrated in FIGS. 10A1 to 10D4, each of the input templates includes three slots. Three images selected first are used from among the four images selected in the description of FIGS. 9A to 9I, for example. It is assumed that the orientations (portrait or landscape) of the images based on the selected three image data items are as illustrated in FIG. 9J in terms of image capturing date/time. It is assumed that the image data 1005 is used for the main slot, and the image data 1006 and the image data 1007 are used for the sub-slots. Here, since the main-slot image 1005 has the latest image capturing date/time as illustrated in FIG. 9J, templates illustrated in FIGS. 10C1 to 10C4 and FIGS. 10D1 to 10D4 in which the main slot is arranged on the right side are extracted as the candidate templates. Since the orientation of the main-slot image data 1005 is portrait, the templates illustrated in FIGS. 10C1 to 10C4 are extracted as the candidates. Since the older sub-slot image 1006 is a portrait image and the newer sub-slot image 1007 is a landscape image, the template illustrated in FIG. 10C2 is selected as the template most suitable for the selected images. In the above-described manner, in which slot of which template each of the images selected in S417 is to be arranged is determined in S418.

In S419, the image correcting unit 214 performs image corrections. The image correcting unit 214 performs image corrections if information indicating image correction ON is input from the correction condition input unit 213. For example, brightness correction, red-eye correction, and contrast correction are performed as image corrections. The image correcting unit 214 does not perform image corrections if information indicating image correction OFF is input from the correction condition input unit 213. The image corrections can be performed on size-converted image data having 1200 pixels at the shorter side and a color space of sRGB, for example.

In S420, the layout information output unit 215 creates layout information. The image arranging unit 212 arranges the image data (on which image corrections have been performed in S419, for example) in the corresponding slot of the template determined in S418. At that time, the image arranging unit 212 re-scales the to-be-arranged image data in accordance with the size information of the slot and arranges the resulting image data. Then, the layout information output unit 215 generates bitmap data of the template in which each image data is arranged.

In S421, it is determined whether the processing of S417 to S420 has been finished for all the double-page spreads. If it is determined that the processing has not been finished (NO in S421), the processing is repeated from S417. If it is determined that the processing has been finished (YES in S421), the automatic arrangement process of FIG. 4 ends.

Through the above-described procedure, the number of image groups is made equal to the specified number of double-page spreads by dividing an image data group and then dividing each divisional image group again or merging divisional image groups, and images selected from respective image groups are arranged in respective double-page spreads. In this way, an album is automatically created. In the above description, the first image is selected based on the score for the main slot and the second and subsequent images are selected based on the score for the sub-slot; however, the selection method is not limited to this one. For example, if a template including a plurality of main slots is prepared, a plurality of images may be selected by using the score for the main slot. In addition, a plurality of templates including different numbers of slots are prepared, various numbers of images may be selected. In this case, the number of images selected in S417 can change in accordance with the number of slots included in the template.

Selection of images in the server or SNS, which is performed when an analysis-target image is generated in S401 of FIG. 4, will be described in detail next. A target still image or target moving image in the specified server or SNS can be obtained according to methods illustrated in FIGS. 15A to 15C, for example.

Figure 15C:
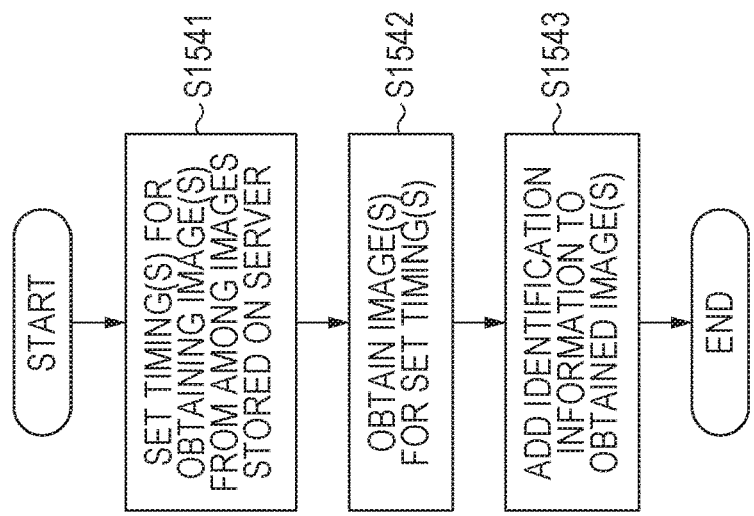
FIGS. 15A to 15C are flowcharts each illustrating an image obtaining process of obtaining an image from a server or a social networking service (SNS).
Figure 15B:
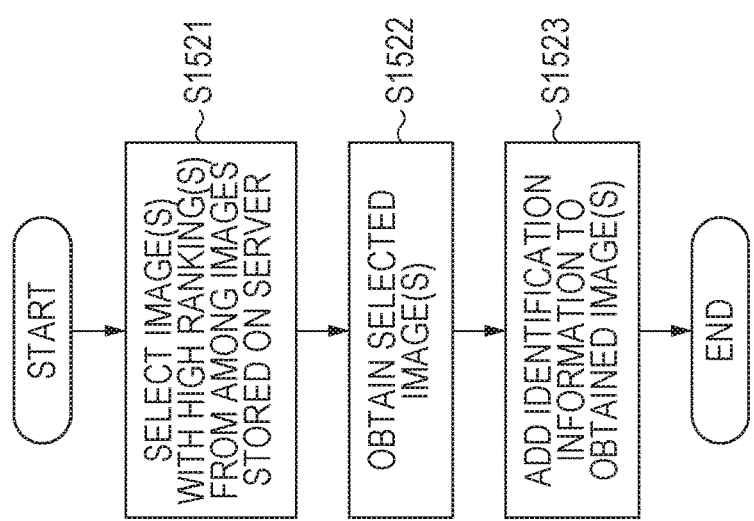
Figure 15A:
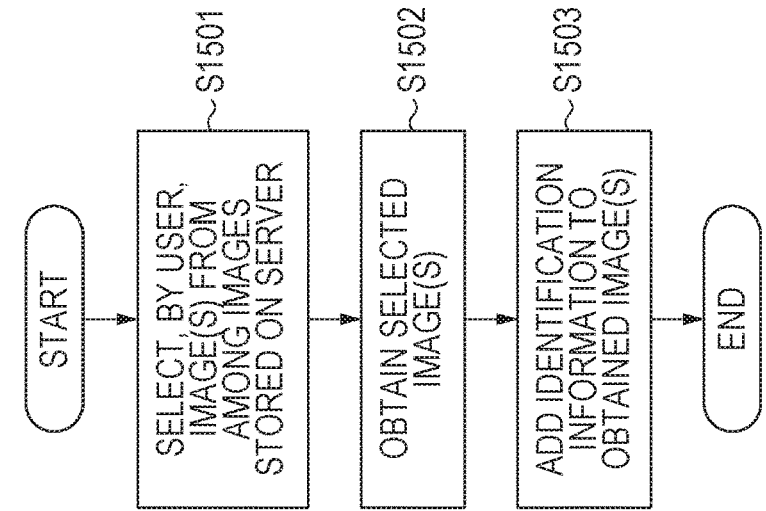

FIG. 15A illustrates a flow of a process of obtaining an image selected by the user from the server or SNS. In S1501, the user selects an image desired to be obtained, from among images stored on the server or SNS. Then, in S1502, the image selected by the user is obtained from the server or SNS. In S1503, identification information is added to the obtained image. Here, the identification information can include information indicating that this image is an image obtained from the server or SNS, image capturing date/time information (replaceable with upload/download date/time), and information about the number of pixels of the image. Further, a rating-based ranking (described later) may be added to the obtained image as the identification information.

FIG. 15B illustrates a flow of a process of obtaining an image assigned information of a high rating and ranked at a high position from the server or SNS. In S1521, an image ranked at a high position is selected. There are cases where the user or another user assigns a rating to the images of the server or SNS. In S1521, for example, a predetermined threshold is set for this rating, and an image assigned a rating higher than or equal to the threshold is selected as a high-rank image. In S1522, the high-rank image is obtained from the server or SNS. In S1523, the above-described identification information is added to the obtained image. In this case, rating information can be added to the image as a rank. For example, a table that converts the rating into a rank is prepared in advance, and the rank is assigned in accordance with the table. The rating can be determined based on the result of the user evaluating the image using five steps or the number of votes from another user, for example.

FIG. 15C illustrates a flow of a process of obtaining an image from the server or SNS at a set timing. In S1541, a timing at which an image is obtained from the server or SNS is set. As the timing, a predetermined number of images, such as every five or ten images, or a predetermined time interval, such as every three hours or more or every three days or more, is set. In S1542, an image corresponding to the set timing is obtained. In S1543, the above-described identification information is added to the obtained image.

Image score computation of S410 of FIG. 4 will be described in detail next with reference to FIG. 12. In S1201, the main subject ID set in the setting of the main subject in S409 of FIG. 4 is obtained. In S1202, a scene ID of interest, which is the scene ID of a scene of interest among scenes (image groups) obtained by segmentation, is obtained. In S1203, the number of subject IDs in each image of interest included in the scene of interest is counted. In S1204, the position of the face indicated by the main subject ID in the image of interest is identified based on the coordinates of the center of the face area. As illustrated in FIG. 5, the face area is managed using the upper left coordinates and the lower right coordinates. The coordinates of the center of the face area can be calculated by, for each of the X coordinate and the Y coordinate of the image, halving a value obtained by subtracting the upper left coordinate from the lower right coordinate and adding the halved result to the upper left coordinate to determine the coordinates for the middle point between the lower right coordinate and the upper left coordinate. In addition, the average of the center coordinates, that is, the centroid of the face of the main subject, is calculated by adding, for each coordinate axis, the coordinates of the center of the face indicated by the main subject ID and dividing the sum by the number of faces.

In S1205, the size of the face indicated by the main subject ID in the image of interest is calculated. A product of absolute values of values obtained by subtracting the upper left coordinate from the lower right coordinate for the X axis and the Y axis is calculated as the size of the face. The face size average is calculated by adding the sizes of the face indicated by the main subject ID together and dividing the sum by the number of faces. In S1206, a score is computed for the number of faces indicated by the main subject ID. As described in S410 of FIG. 4, the averages and the standard deviations for the number of faces, the face position, and the face size are prepared in advance for the main slot and the sub-slot on a scene-category basis. Values corresponding to the category of the scene of interest among these prepared averages and standard deviations are read, and the score for the main slot is calculated from the read average and standard deviation for the number of faces for the main slot and the number of faces indicated by the main subject ID obtained from the images of interest. Specifically, Equation (1) described above is used to calculate the score by setting the number of faces as the feature quantity. The score is determined by using Equation (1) on a scene-category basis from the average and standard deviation for the category of the scene. The score for the sub-slot is also calculated by using Equation (1) from the read average and standard deviation of the number of faces for the sub-slot and the number of faces indicated by the main subject ID obtained from the images of interest.

In S1207, the score of the position of the face indicated by the main subject ID is computed. As in the computation of the score for the number of faces, the average and standard deviation of the face position for the main slot and the sub-slot are read, and the score is calculated from these values and the average center coordinates determined for the main subject ID. The scores of the face position for the main slot and the sub-slot are calculated using Equation (1). In S1208, the score of the size of the face indicated by the main subject ID is computed. As in the computation of the score for the number of faces, the average and standard deviation of the face size for the main slot and the sub-slot are read, and the score is calculated from these values and the average face size determined for the main subject ID. The scores of the face size for the main slot and the sub-slot are calculated using Equation (1).

In S1209, the score of focus is computed. Focus thresholds for the main slot and the sub-slot are read, and scores for the main slot and the sub-slot are calculated by using Equation (5) below from the values and the determined in-focus degree.

$$\text{Score}=50-|50\times(\text{Threshold}-\text{Feature Quantity})/\text{Threshold}| \quad (5)$$

The score is calculated by substituting the in-focus degree for the feature quantity. If the in-focus degree exceeds the threshold, the score may be calculated by substituting the same value as the threshold for the feature quantity or the score may be set equal to 50. In S1210, the score of the number of pixels is computed. As in calculation of the score of focus, the number-of-pixels thresholds for the main slot and the sub-slot are read, and scores for the main slot and the sub-slot are calculated using Equation (5) above from these values and the number of pixels determined for the image of interest. If the number of pixels exceeds the threshold, the score may be calculated by substituting the same value as the threshold for the feature quantity or the score may be set equal to 50.

In S1211, an average of the scores for the main slot and an average of the scores for the sub-slot determined in S1206 to S1210 are calculated. These averages serve as the scores of the image of interest for the main slot and the sub-slot. In addition, the score of focus may be added to the score for the main slot and the score for the sub-slot as described above. In S1212, it is determined whether the processing of S1203 to S1211 has been finished for all the images included in the scene. If the processing has not been finished (NO in S1212), the process returns to S1203. If the processing has been finished (YES in S1212), the process proceeds to S1213. In S1213, it is determined whether the processing of S1202 to S1212 has been finished for all the scenes of the specified image data group. If the processing has not been finished (NO in S1213), the process returns to S1202. If the processing has been finished (YES in S1213), the image score computation process ends. In the above manner, the score for each image of each scene is evaluated. Note that FIG. 12 illustrates the example in which the score is evaluated using all of the number of, the position of, and the size of the face, the focus, and the number of pixels; however, evaluation may be performed by using some of these pieces of information.

Figure 12:
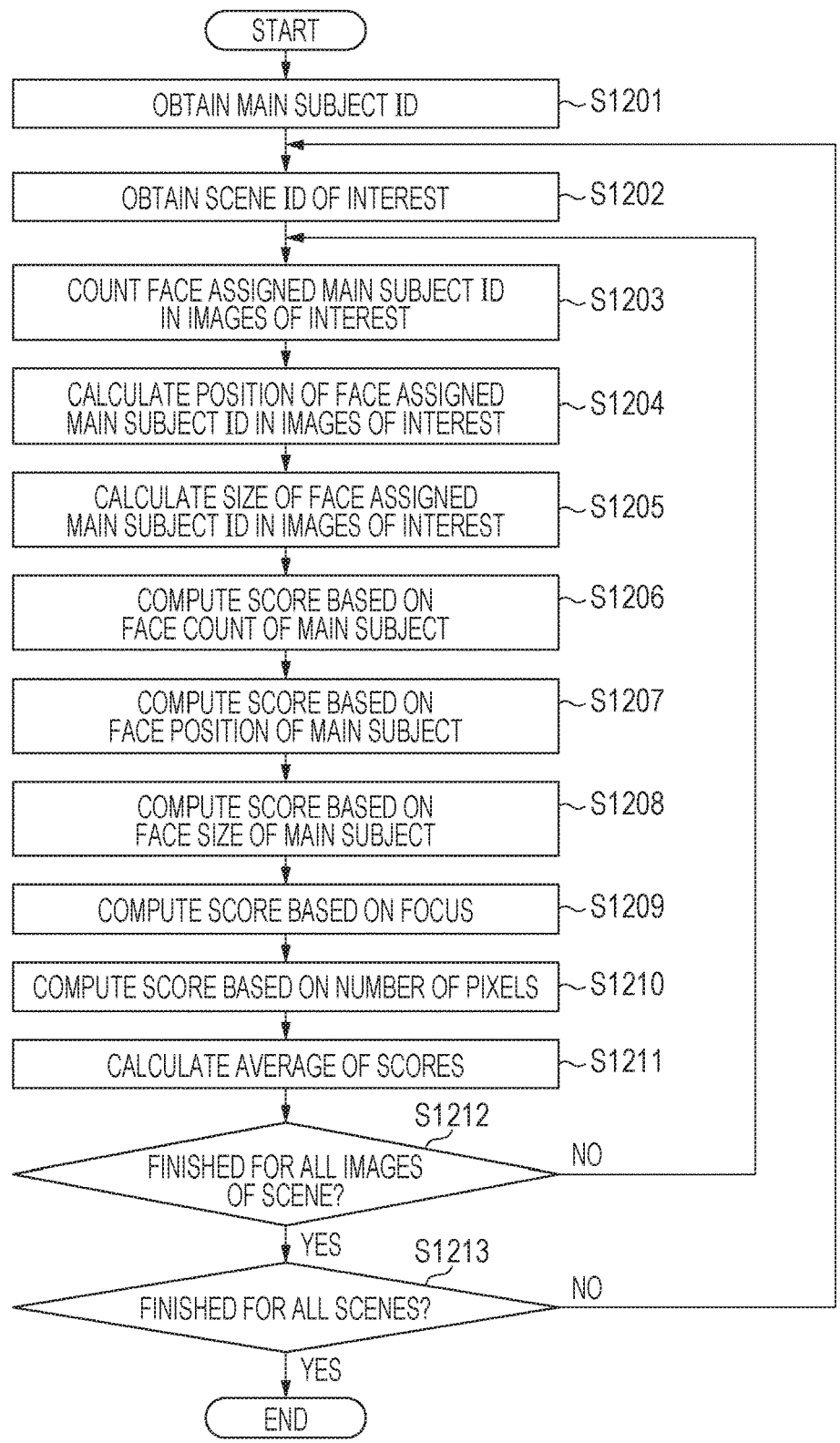
FIG. 12 is a flowchart illustrating an image score computation process.

FIGS. 16A and 16B illustrate score computation results obtained by the process illustrated in FIG. 12. Although FIGS. 16A and 16B illustrate the scores for the main slot as an example, the scores of the respective images for the sub-slot are also calculated. An image ID field indicates the ID used to distinguish between images. The ID including "local" indicates that the image is an image obtained from a folder specified using the path box 302, and the ID including "server" indicates that the image is an image obtained from a server or SNS specified using the server name box 310. In addition, the ID including "high" indicates that the image is an image including more than 2 million pixels, and the ID including "low" indicates that the image is an image including 2 million pixels or less. Further, the ID including "static" indicates that the image is a still image, and the ID including "dynamic" indicates that the image is a frame image extracted from a moving image. The number included in the ID indicates the order of the image capturing date/time. The distinction between "high" and "low" is described by using 2 million pixels as a boundary; however, another value may be used as the boundary.

The score field in FIGS. 16A and 16B shows scores calculated using a score computation method in common for the local still images and moving images and SNS images through the process illustrated in FIG. 12. The corrected score field shows a result obtained by multiplying the score by a coefficient. The score for an image with "local_high_dynamic_" is multiplied by 1.1, and the score for an image with "server_low_static_" is multiplied by 1.5 because of the following reason. When a digital camera is used for capturing images, still images generally include about 10 million pixels, whereas moving images include about 2 million pixels even in full high-definition (HD) images. Thus, the score of the number of pixels of the moving images is low. In addition, since moving images of a moving subject are often captured, the score for focus is sometimes low because the images become out of focus due to shaking. In addition, since images obtained from SNS sometimes include less than 2 million pixels, the score thereof tends to be low.

Although the details will be described later, in the present embodiment, an image is selected from among moving images or SNS images by excluding local still images from selection candidates, and then an image is selected from among selection candidates including the local still images, the moving images, and the SNS images. At that time, the score for moving images and SNS images tends to be lower than the scores for local still images which include a large number of pixels. Accordingly, the score is assigned by using a scoring method for correcting the score for such images to increase the score. In this way, the scores for images are balanced, and the probability of an image being selected from among moving images and SNS images is increased in image selection in which the moving images and SNS images are compared with local still images.

In addition, since the user uploads images to the SNS for a certain purpose and the images are selected as images to be used in an album, it is expected that the user intends to use the images in the album. Accordingly, the score for SNS images can be greatly increased. A value different from the aforementioned one may be used as the multiplying factor used to increase the score.

In the example in FIGS. 16A and 16B, the scores of the local moving images ("local_high_dynamic_") and the scores of the server or SNS still images ("server_low_static_") increase as a result of correction. However, the correction is not limited to this one, and correction may be performed to decrease the scores of local still images ("local_high_static_"). Alternatively, correction may be performed so that the scores of local moving images and server or SNS still images increase and the scores of local still images decrease.

In addition, correction different from the above one may be performed so that the score is doubled if a server or SNS moving image is obtained.

The ranking field indicates the ranking in the descending order of the score, and the corrected ranking field indicates the ranking in the descending order of the corrected score. The rating-based score field indicates the value derived from the ranking based on the rating. The dynamic-movement score (movement) field indicates the value derived in accordance with the score for the face size. Moving images including a moving subject, for example, moving images of children running a race, are sometimes captured. In such a case, it is considered that if frames of an area near the goal in which the face size is large are arranged for the example of the footrace of children, the user satisfaction increases. Accordingly, for example, the dynamic-movement score is set to 0, 0, 5, 15, 30, and 50 for the scores of the face size of 0, 10, 20, 30, 40, and 50, respectively.

Suppose that six images in FIG. 16A or 16B are included in an image group including the image (4) in FIG. 9I. In such a case, if an image is selected based on the score, the selected image (4) is the image "local_high_static_7". In addition, even if an image is selected based on the corrected score, the selected image (4) is the image "local_high_static_7". If the scores such as the ones illustrated in FIG. 16A or 16B are assigned, all the selected images can be still images also in the divided image capturing areas respectively including the images (1) to (3) of FIGS. 9F to 9H. The correction coefficient may be increased to increase the value by which the score for moving images and SNS images is increased. However, if the correction coefficient is increased too much, all the selected images can be frame images of moving images or SNS images.

Accordingly, in the present embodiment, the album creation application selects images by performing a process described below with reference to FIG. 17 during the image selection of S417 illustrated in FIG. 4.

Figure 17:
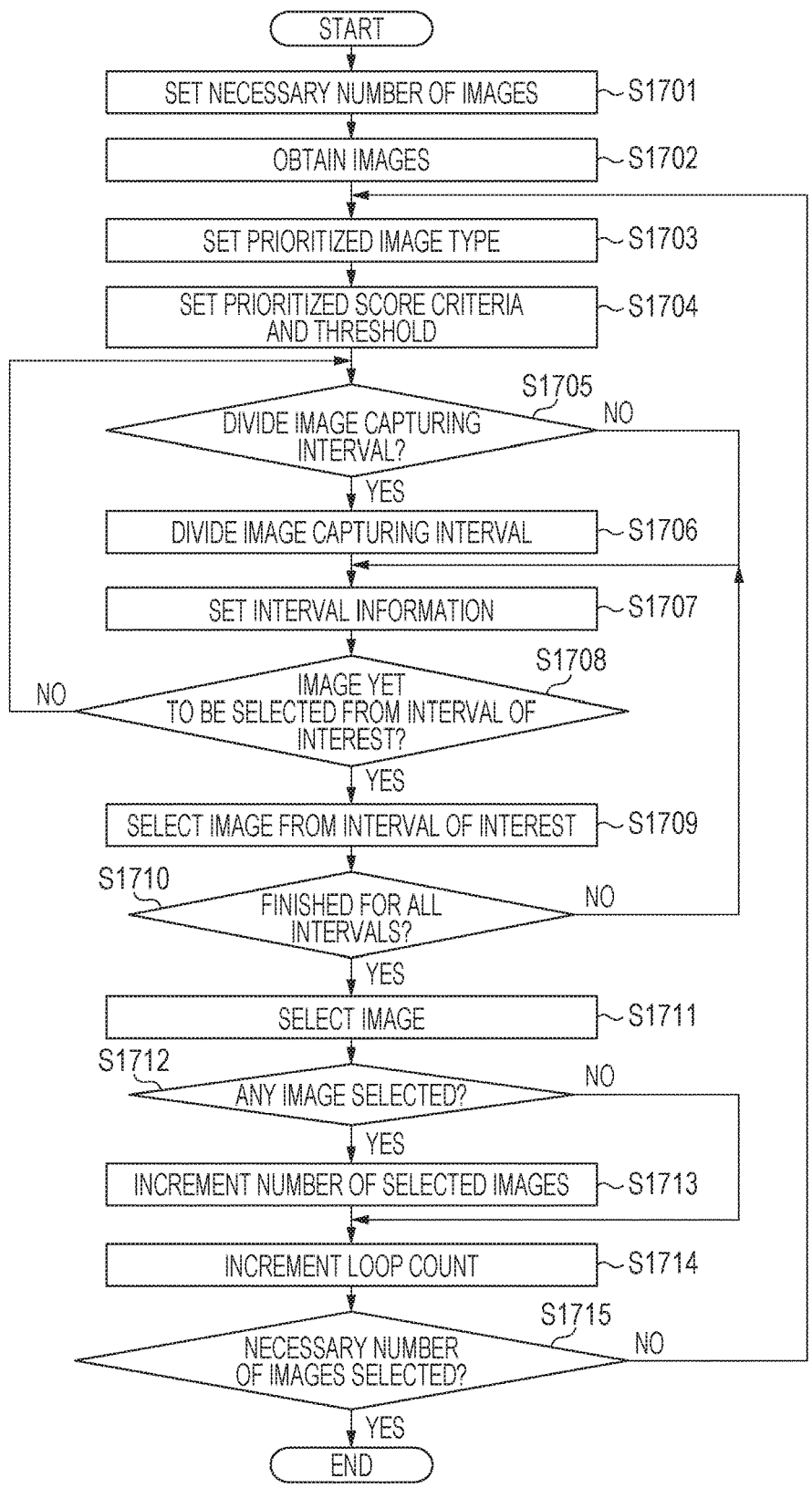
FIG. 17 is a flowchart illustrating an image selection process.

Referring to FIG. 17, in S1701, the number of images to be selected for a double-page spread of interest is set. In S1702, an image data group assigned to the double-page spread is obtained. In S1703, the type of images to be selected is set. The type of images can be still images or moving images. For example, the type of images may be images stored in SNS or a network server or images in a local folder, and is determined as a type having a certain form of distinguishable attribute. An example where moving images are set will be described first. A method for setting the prioritized image type which is included in a table in association with a number-of-images counter and a loop counter (described later) is used. In the initial state, the number-of-images counter and the loop counter are set to zero. At that time, the table is set so that moving images are prioritized, for example.

In S1704, score criteria and thresholds used for selection are set. The score criteria and thresholds held in a table in association with the loop counter and the prioritized image type are set. An example in which the corrected score for the main slot, the score for focus, and the score for the number of pixels are set is described here. In addition, thresholds for these criteria are set to 25. The thresholds are not limited to this value and may be appropriately set to a user satisfying level through an experiment, for example. Different thresholds may be used for different score criteria.

In S1705, it is determined whether to divide the image capturing interval as illustrated in FIGS. 9A to 9I. If it is determined to divide the image capturing interval (YES in S1705), the process proceeds to S1706. If it is determined not to divide the image capturing interval (NO in S1705), the process proceeds to S1707. In S1706, the image capturing interval is divided as illustrated in FIGS. 9A to 9I. In S1707, interval information is set for an image capturing interval (interval obtained by division in S1706 depending on the case) of interest from which an image is to be obtained. The interval information includes image IDs of images contained in the image capturing interval of interest (interval of interest) and scores computed for the images.

In S1708, it is determined whether an image is yet to be selected from the interval of interest. That is, it is determined whether an image has already been selected from the interval of interest so as not to select two images from the same interval as described in FIGS. 9A to 9I. If an image is yet to be selected from the interval of interest (YES in S1708), the process proceeds to S1709. If an image has already been selected (NO in S1708), the process returns to S1705, in which the processing is performed for another interval.

In S1709, an image is selected for the image type set in S1703 with reference to the score criteria and the thresholds set in S1704.

In the case where the interval of interest includes six images illustrated in FIG. 16A, the corrected scores, the scores for focus, and the scores for the number of pixels of the images "local_high_dynamic_2/5/8" are focused on. In addition, thresholds set for the corrected score, the score for focus, and the score for the number of pixels are focused on.

If the image "local_high_dynamic_5" is a moving image having the scores exceeding all the thresholds set for the score criteria and having the highest corrected score, the image "local_high_dynamic_5" is selected as an image of the interval of interest. In FIG. 16A, the image "local_high_dynamic_5" is ranked at the fourth place based on the corrected score but can be selected as a moving image of a user satisfying level according to the present embodiment. If no image satisfying the thresholds is found from the set image type, no image is selected from the interval of interest. Since local still images are excluded from selection candidates at this point, the score not corrected may be compared with each threshold instead of the corrected score.

In S1710, it is determined whether the image selection processing has been performed for all the intervals (including the case where no image is selected in S1709). For example, when the loop in the flow illustrated in FIG. 17 is performed a plurality of times and the image capturing interval is divided as illustrated in FIG. 9H, the fourth image is selectable from three intervals (i.e., intervals from which no image is selected). It is determined whether the image selection processing has been performed for all of the three intervals. If the image selection processing has been performed for all the intervals (YES in S1710), the process proceeds to S1711. If image selection processing has not been performed for at least one interval (NO in S1710), the process returns to S1707, in which the processing is performed for such an interval.

In S1711, one image having the highest corrected score is selected from among the selected images. For example, in the case where (up to) three images have been selected as in FIG. 9H, an image having the highest corrected score is selected from among the three images. In S1712, it is determined whether an image has been selected in S1711. Since an image is selected in S1711 as long as at least one image is selected in S1709, the determination of S1712 can be considered as determination as to whether there is an image suitable for the image type and the score criteria set in S1703 and S1704. If an image has been selected in S1711 (YES in S1712), the process proceeds to S1713. If no image has been selected (NO in S1712), the process proceeds to S1714.

In S1713, the number-of-images counter is incremented. The initial value of the number-of-images counter is set to zero for each double-page spread. In S1714, the loop counter is incremented. The initial value of the loop counter is set to zero for each double-page spread. In S1715, it is determined whether the number of images set in S1701 matches the number-of-images counter. If the number of images set in S1701 matches the number-of-images counter, the number of images has been selected (YES in S1715). Thus, the image selection process ends. If the number of images set in S1701 does not match the number-of-images counter (NO in S1715), the selected images are not enough. Thus, the process returns to S1703.

When the process returns to S1703, the number-of-images counter and the loop counter are referred to and the prioritized image type held in the table in association with the number-of-images counter and the loop counter is set. If the number-of-images counter is 1 and the loop counter is 1 when the process returns to S1703, the prioritized image type is set to server or SNS images, for example. At that time, a table with which the prioritized image type is identifiable, for example, a table indicating that the prioritized image type is server or SNS images in accordance with the values of the number-of-images counter and the loop counter may be prepared. In addition, no prioritized image type may be set depending on the values of the number-of-images counter and the loop counter. For example, when the number-of-images counter is 2 and the loop counter is 2, it is expected that a moving image and an SNS image are selected when the number-of-images counter is 1 and the loop counter is 1. Thus, no prioritized image type may be set, and image selection may be performed from among all types of images. In addition, if it is expected that no moving image and no SNS image are selected, such as if the number-of-images counter is 0 and the loop counter is 2, still images may be set as the prioritized image type. Note that when image selection is performed from among all types of images by setting no prioritized image type, image selection is performed by comparing the corrected scores illustrated in FIGS. 16A and 16B.

During a loop performed when the number-of-images counter indicates a small value, a table that sets moving images and server or SNS images over still images can be used. In this way, an image can be selected from moving images and server or SNS images over still images from an interval illustrated in FIG. 9A before the image capturing interval is further divided.

A table can also be used when the score criteria are set in S1704. For example, when the loop counter is 0 and the prioritized image type is set to moving images, the corrected score for the main slot, the score for focus, and the score for the number of pixels can be used as the score criteria. For example, when the loop counter is 1 and the prioritized image type is server or SNS images, the corrected score for the main slot, the score for focus, and the score for the number of pixels can be set as the score criteria. For example, when the loop counter is 2 and the prioritized image type is still images, the corrected score for the main slot can be set as the score criterion. In the present embodiment, a table with which these correspondences are identifiable can be prepared. In the above description, the corrected score, the score for focus, and the score for the number of pixels are used when moving images are subjected to selection; however, the dynamic-movement score (movement) illustrated in FIG. 16A may be used. For example, the image "local_high_dynamic_5" is selected; however, a moving image having the highest dynamic-movement score may be selected from among moving images having the corrected score, the score for focus, and the score for the number of pixels all of which exceed respective thresholds. In this case, the image "local_high_dynamic_8" having a corrected score lower than the image "local_high_dynamic_5" can be selected. In this way, an image considered to satisfy the user more can be selected.

Even in the case where still images with a large number of pixels and still images with a small number of pixels coexist as illustrated in FIG. 16B, server or SNS images can be set as prioritized images. In this way, the image "server_low_static_6" having the highest corrected score among the images "server_low_static_" can be selected if the thresholds for the set score criteria are satisfied. In addition, by setting a setting using the rating-based score so that the image "server_low_static_9" is selected, an image satisfying the user more can be selected.

As described above, the image type selected during image selection, the score criteria of a user satisfying level, and thresholds are set. In this way, a probability of a frame image of a moving image or SNS image that has a lower image quality than still images with a large number of pixels but satisfies certain criteria being arranged together with still images can be increased.

In addition, even an image whose corrected score does not exceed the threshold or an image that is not selected as a result of comparison with another prioritized image from among moving images or SNS images set as prioritized images can be selected as a result of comparison of its corrected score with those of still images.

As illustrated in FIGS. 16A and 16B, since the scores of moving images and SNS images increase by correction unlike local still images, selection of only a small number of moving images and SNS images can be avoided when the user wishes to select a certain number of moving images and SNS images. However, an image having a poor image quality among the moving images and SNS images is not selected by prioritized selection for moving images or SNS images even if the score is corrected, and it is highly likely that the image is not selected as a result of comparison with local still images. Thus, even if an image having poor image quality is the prioritized image, such as a moving image or SNS image, selection of such an image having a poor image quality can be avoided.

In the example illustrated in FIG. 17, the example of a process in which the prioritized image is set and then an image is selected from an image selection interval of interest has been described. An example of a process in which the prioritized image is reset on the basis of the number of images of each image type in the interval of interest will be described below. For example, in the case where there are a large number of frame images of moving images and a small number of still images in the interval of interest, a setting can be set so that a moving image is selected from the interval of interest.

Figure 18:
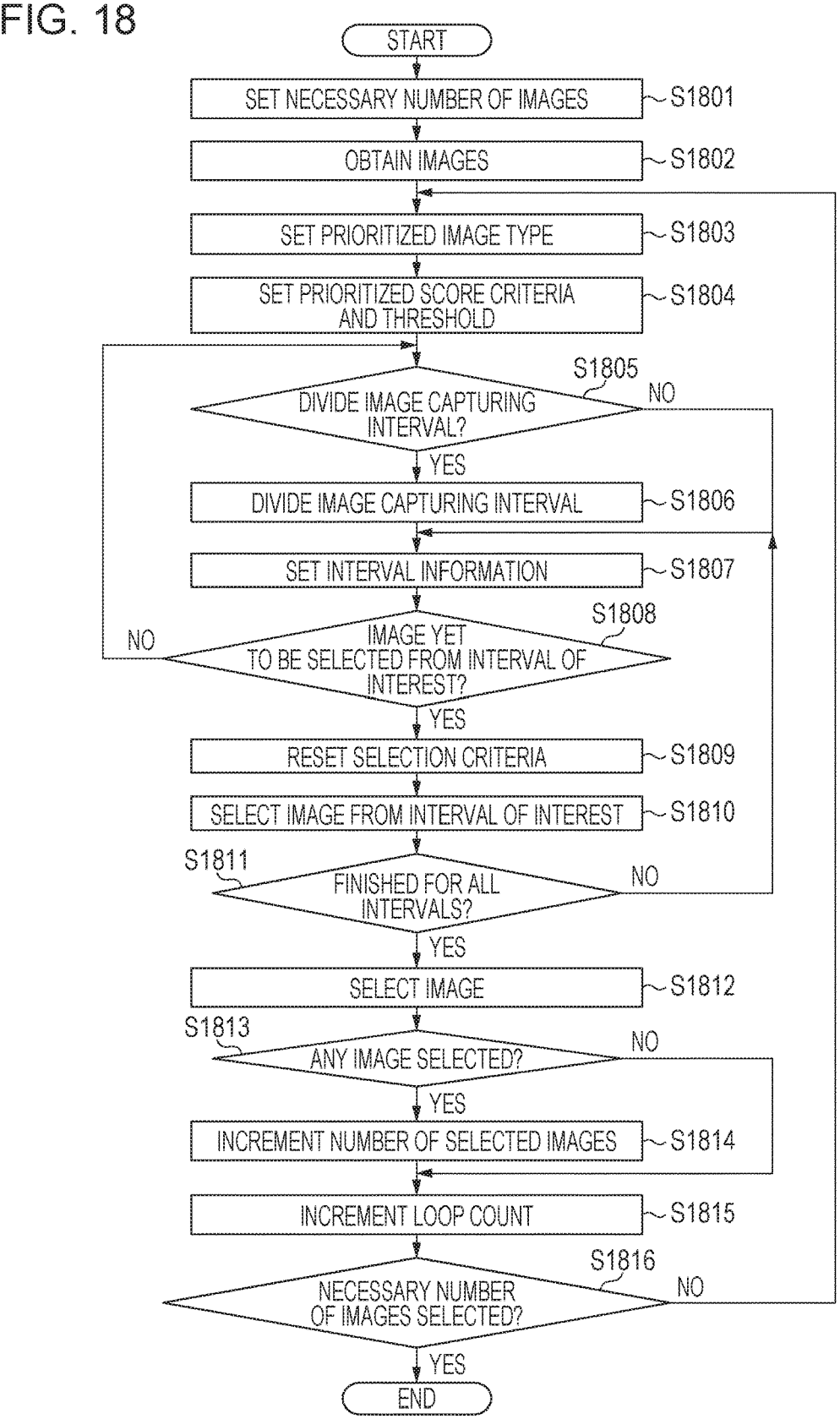
FIG. 18 is a flowchart illustrating another image selection process.

FIG. 18 illustrates a flow of an image selection process different from the example illustrated in FIG. 17. Since processing of S1801 to S1808 in FIG. 18 is substantially the same as processing of S1701 to S1708 of FIG. 17, respectively, a description thereof is omitted here. In addition, since processing of S1810 to S1816 is substantially the same as the processing of S1709 to S1715 of FIG. 17, respectively, a description thereof is omitted. That is, processing of S1809 of FIG. 18 is different from the processing of FIG. 17. Accordingly, the processing of S1809 will be described below.

In S1809, selection criteria used in S1810, specifically, the prioritized image set in S1803 and the score criteria and thresholds set in S1804, are reset. In this processing, the number of images included in the interval of interest is obtained for each image type. For example, if only 1 still image is included in the interval and 30 frame images of moving images are included in the interval, it is expected that the user has prioritized capturing of moving images over capturing of still images during an image capturing time period corresponding to this interval. Accordingly, even if the prioritized image is set to still images in S1803, the prioritized image is reset to moving images in S1809 in such a circumstance. In addition, if there are a large number of SNS images and a small number of still images, SNS images may be reset as the prioritized image. For example, if the number of still images in the interval of interest is below a threshold set in advance and frame images of moving images are included in the interval of interest, it is determined whether resetting of the prioritized image is necessary so that the prioritized image is set to moving images. For example, if a threshold of 5 images is set but there is only 1 still image in a certain interval of interest and there are frame images of moving images in that interval of interest, the prioritized image may be set to moving images. In this case, a threshold for setting the prioritized image to moving images may be provided. The determination as to whether resetting is needed can be performed by using substantially the same manner as the above-described one when the prioritized image is set to SNS images. Specifically, for example, the above-described resetting is performed so that an SNS image is selected at least one of the cases where the number of non-SNS images is below a threshold and where the number of SNS images is greater than or equal to a threshold. In addition, if there are a small number of still images and a large number of moving image and SNS images, a larger number of images among the moving images and the SNS images may be set as the prioritized image or the image type that exceeds the corresponding threshold among the thresholds respectively set for moving images and SNS images in advance may be set as the prioritized image. In addition, the priority order may be determined in advance for moving images and SNS images. In this case, the prioritized image is set in accordance with the priority order. If it is not necessary to reset the prioritized image, such as if the number of still images is greater than or equal to the threshold, the prioritized image set in S1803 is used without resetting it.

The score criteria and thresholds are also reset in accordance with the type of the prioritized image determined by resetting. In this way, the score criteria and thresholds of a level satisfying the user more can be set. With the above configuration, an image with a high priority can be selected based on the number of images in a specific interval, and frame images of moving images and SNS images can be arranged together with still images.

Figure 14:
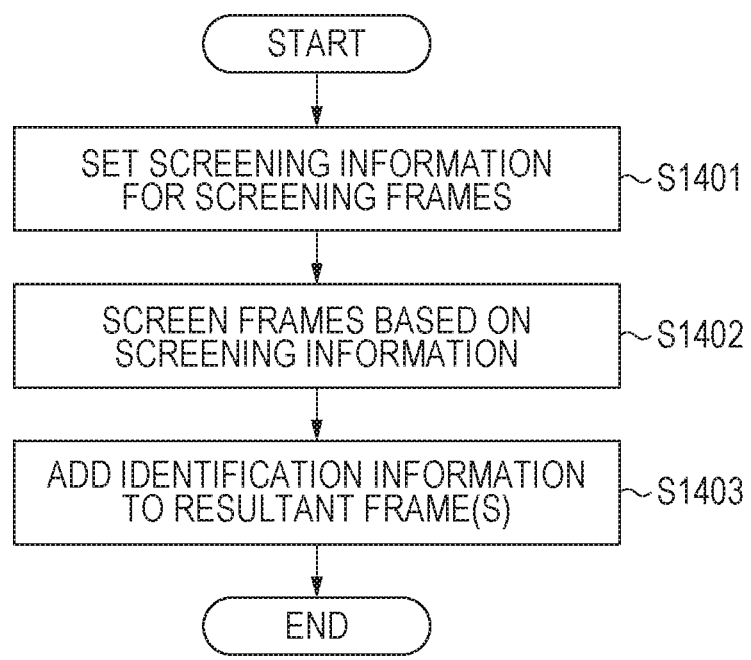
FIG. 14 is a flowchart illustrating a frame screening process.

In the above-described embodiment, an example of extracting frames from moving images in accordance with set timings has been described. Screening may be performed on the frames extracted in this manner in accordance with a flow illustrated in FIG. 14. In S1401, screening information regarding, for example, focus, the face, or the main subject for frame screening is set. If the main subject is used as the screening information, the process illustrated in FIG. 14 can be performed after S409 of FIG. 4. If the main subject is not used as the screening information, the process illustrated in FIG. 14 can be performed after S403 before S410. In S1402, frames extracted from moving images are screened based on the set screening information. For example, frames having the focus score greater than or equal to a certain level, frames including the face, and frames including the main subject are screened so that such frames are subjected to score computation in S410 of FIG. 4. In S1403, identification information is assigned to the screened frame. Identification information assigned when the frame is extracted may be used as this identification information or information indicating that the frame is the screened frame may be assigned as the identification information. With the above configuration, the processing time can be decreased by limiting frames subjected to score computation and image selection.

In addition, in the above-descried embodiment, even if the server or SNS images are still images, the server or SNS images may be set to be prioritized over moving images. The reason for this is as follows. For example, it can be considered that images uploaded to the SNS by the user for a certain purpose, and if such images are selected by the user, it is expected that the user strongly wishes to include the SNS images in an album. The same applies to images uploaded to a server.

In addition, in the above-described embodiment, it has been described that the score for frame images of moving images and SNS images tends to be lower than that for still images having a larger number of pixels tends in terms of the number of pixels. In addition to the number of pixels, images obtained by compressing original images at a high compression ratio (that is, images whose amount of data is reduced more) sometimes have a low quality, such as noise stands out more than images compressed at a low compression ratio. For example, if the file size of an SNS image is large, a large space is needed in the server when the SNS image is stored on the server. Thus, the SNS image is sometimes compressed at a high compression ratio to decrease the file size. In addition, to reduce the upload/download transfer time, the file size of an image subjected to communication is sometimes reduced greatly by compressing the image at a high compression ratio. In addition, the number of pixels may be reduced in terms of the capacity of the server and the transfer time. Since such an image has a low quality, the image is unlikely to be selected as an image to be arranged.

However, it is considered that even if such an image has a low quality, the user has uploaded or downloaded the image for a certain purpose. Thus, such an image is considered to be assigned a high rating by the user. In addition, there is a case where the user selected a highly compressed image stored in the local folder. Accordingly, the image type to be selected in image selection (e.g., images with the compression ratio higher than a certain level) and the score criteria and the thresholds of a level satisfying the user are set so that the image with a high compression ratio is more likely to be selected. In this way, even an image compressed at a high compression ratio and having a lower quality than an image compressed a low compression ratio can be selected as an image to be arranged together with an image with a low compression ratio if the image satisfies certain criteria.

As described above, even an image having a relatively low quality in terms of the number of pixels or the compression ratio (an image having a relatively poor image quality) is more likely to be selected by setting the image type to be selected during image selection and the score criteria and thresholds of the level satisfying the user. Accordingly, even an image having a relatively low quality can be selected as an image to be arranged together with images having a relatively high quality if the image satisfies certain criteria.

In addition, in the above-described embodiment, each process has been described as the image selection method used to create an album; however, the process can be used in image selection for single sheet printing. For example, suppose that the user can set the number of images for single sheet printing for every five images and has set the number of images for single sheet printing to 25. In this case, image data groups equivalent to five double-page spreads, which is obtained by dividing 25 by 5, are assigned. As the assignment method, the above-described image assignment method for an album can be used. Specifically, setting of S1701 of FIG. 17 is performed for the case where the number of images selected for single sheet printing from the scene assigned for the double-page spread is 5. The processing from S1702 is as described above. In this way, a moving image or SNS image can be selected as an image subjected to single sheet printing together with a still image from the image data group.

In addition, in the above-described embodiment, the example of increasing the score by multiplying the score for frame images of moving images and server or SNS images by a coefficient has been described; however, the method for increasing the score is not limited to this one. For example, the conditions for the score may be relaxed for frame images of moving images and server or SNS images compared with still images with a large number of pixels or with a low compression ratio. In this way, the score may be increased.

The aspect of the embodiments can be implemented in the following manner. A program for implementing one or more functions of the above embodiment is supplied to a system or an apparatus via a network or a recording medium, and one or more processors in a computer of the system or the apparatus reads and executes the program. In addition, the aspect of the embodiments can also be implemented by a circuit (e.g., Application Specific Integrated Circuit (ASIC)) that implements one or more functions.

The aspect of the embodiments is not limited to the case where the plurality of functions illustrated in FIG. 2 are implemented by one apparatus. The plurality of functions illustrated in FIG. 2 may be implemented as a result of a plurality of apparatuses performing a corresponding function among the plurality of functions and operating in cooperation with one another.

Other Embodiments

Embodiments of the disclosure can also be realized by a computer of a system or apparatus that reads out and executes computer executable instructions recorded on a storage medium (e.g., non-transitory computer-readable storage medium) to perform the functions of one or more of the above-described embodiment(s) of the disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2015-255236, filed Dec. 25, 2015, which is hereby incorporated by reference herein in its entirety.

What is claimed is:

1. An image processing method executed by at least one processor in an image processing apparatus, the method comprising:
    acquiring a plurality of still images and a moving image based on conditions specified by a user via a user interface;
    extracting a plurality of frame images from the acquired moving image;
    evaluating the extracted plurality of frame images and the acquired plurality of still images;
    performing, based on the evaluation of the plurality of frame images, a first selection process for selecting an image to be laid out, from a first group that includes the extracted plurality of frame images and does not include the acquired plurality of still images;
    performing, based on the evaluation of the plurality of frame images and the plurality of still images, a second selection process for selecting an image to be laid out from a second group that includes both of the extracted plurality of frame images and the acquired plurality of still images; and
    laying out the images selected by the first selection process and the second selection process so as to generate layout data to be displayed on a display screen.

2. The image processing method according to claim 1, wherein the second selection process is performed after the first selection process.

3. The image processing method according to claim 2, wherein as the second selection process, an image to be output is selected from among the plurality of still images and the rest of the plurality of frame images that have not been selected in the first selection process.

4. The image processing method according to claim 2, wherein the evaluating includes evaluating each of the plurality of frame images by using a first method, and evaluating each of the plurality of still images by using a second method, the first method being a method that increases a probability of an image being selected by the second selection process compared with the second method.

5. The image processing method according to claim 4, wherein the evaluating includes assigning a score to each of the plurality of frame images and the plurality of still images by using the second method, and performing correction by using the first method to increase the scores assigned to the plurality of frame images by using the second method.

6. The image processing method according to claim 1, wherein as the first selection process, a plurality of images are selected by comparing an evaluation value obtained for each of the plurality of frame images in the evaluating with a predetermined threshold and an image is further selected from among the plurality of selected images.

7. The image processing method according to claim 6, wherein the first selection process is not performed if no image is selected by the comparing.

8. The image processing method according to claim 2, wherein as the second selection process, an image is selected by comparing evaluations of the plurality of frame images and the plurality of still images obtained in the evaluating with one another.

9. The image processing method according to claim 1, wherein the output images are arranged in a template in the layout process.

10. The image processing method according to claim 1, wherein the evaluating includes evaluating the plurality of frame images and the plurality of still images based on at least one of focus, the number of pixels, a compression ratio, a number of faces in an image, a position of the face, a size of the face, a rating given by a user, and a motion of a subject.

11. The image processing method according to claim 1, wherein the image to be laid out in excess of a first threshold is selected from the first group in the first selection process, and the image to be laid out in excess of a second threshold is selected from the second group in the second selection process.

12. The image processing method according to claim 1, wherein the first selection process is performed separately from the second selection process.

13. An image processing apparatus that selects an image to be output, comprising:
- at least one processor; and
- a memory coupled to the at least one processor, the memory having instructions that, when executed by the processor, performs operations as:
- an acquiring unit configured to acquire a plurality of still images and a moving image based on conditions specified by a user via a user interface;
- extracting unit configured to extract a plurality of frame images from the acquired moving image;
- an evaluating unit configured to evaluate the extracted plurality of frame images and the acquired plurality of still images;
- a selecting unit configured to perform, based on the evaluation of the plurality of frame images, including a first selection process for selecting an image to be laid out, from a first group that includes the extracted plurality of frame images and does not include the acquired plurality of still images and to perform, based on the evaluation of the plurality of frame images and the plurality of still images, a second selection process for selecting an image to be laid out from a second group that includes both of the extracted plurality of frame images and the acquired plurality of still images; and
- an output unit configured to lay out the images selected by the first selection process and the second selection process so as
to generate layout data to be displayed on a display screen.

14. An image processing method executed by at least one processor in an image processing apparatus, the method comprising:
- evaluating the plurality of downloaded images and the plurality of still images based on conditions specified by a user via a user interface;
- performing, based on the evaluation of the plurality of downloaded images, a first selection process for selecting an image to be laid out, from a first group that includes the plurality of downloaded images and does not include the plurality of still images;
- performing, based on the evaluation of the plurality of downloaded images and the plurality of still images, a second selection process for selecting an image to be laid out, from a second group that includes both of the plurality of downloaded images and the plurality of still images; and
- laying out the images selected by the first selection process and the second selection process
- so as to generate layout data to be displayed on a display screen.

15. The image processing method according to claim 14, wherein the second selection process is performed after the first selection process.

16. The image processing method according to claim 15, wherein as the second selection process, an image to be output is selected from among the plurality of still images and the rest of the plurality of downloaded images that have not been selected in the first selection process.

17. The image processing method according to claim 15, wherein the evaluating includes evaluating each of the plurality of downloaded images by using a first method, and evaluating each of the plurality of still images by using a second method, the first method being a method that increases a probability of an image being selected by the second selection process compared with the second method.

18. The image processing method according to claim 17, wherein the evaluating includes assigning a score to each of the plurality of downloaded images and the plurality of still images by using the second method, and performing correction by using the first method to increase the scores assigned to the plurality of downloaded images by using the second method.

19. The image processing method according to claim 18, wherein as the first selection process, a plurality of images are selected by comparing an evaluation value obtained for each of the plurality of downloaded images in the evaluating with a predetermined threshold and an image is further selected from among the plurality of selected images.

20. The image processing method according to claim 19, wherein the first selection process is not performed if no image is selected by the comparing.

21. The image processing method according to claim 15, wherein as the second selection process, an image is selected by comparing evaluations of the plurality of downloaded images and the plurality of still images obtained in the evaluating with one another.

22. The image processing method according to claim 14, wherein the output images are arranged in a template in the layout process.

23. The image processing method according to claim 14, wherein the image to be laid out in excess of a first threshold is selected from the first group in the first selection process, and the image to be laid out in excess of a second threshold is selected from the second group in the second selection process.

24. The image processing method according to claim 14, wherein the first selection process is performed separately from the second selection process.

* * * * *